US011689660B2

(12) United States Patent
Adolphe et al.

(10) Patent No.: US 11,689,660 B2
(45) Date of Patent: Jun. 27, 2023

(54) METHODS AND SYSTEMS FOR DETECTING DISINFORMATION AND BLOCKING ROBOTIC CALLS

(71) Applicant: Forward Edge AI, Inc., San Antonio, TX (US)

(72) Inventors: Eric Adolphe, San Antonio, TX (US); Jesse Cai, McLean, VA (US); Karthik Prasanna Maiya, Chantilly, VA (US); Hongyi Guan, Herndon, VA (US); Ben Sisko Adolphe, San Antonio, TX (US)

( * ) Notice: Subject to any disclaimer, the term of this patent is extended or adjusted under 35 U.S.C. 154(b) by 220 days.

(21) Appl. No.: 17/110,688

(22) Filed: Dec. 3, 2020

(65) Prior Publication Data

US 2021/0168238 A1 Jun. 3, 2021

Related U.S. Application Data

(60) Provisional application No. 62/942,873, filed on Dec. 3, 2019.

(51) Int. Cl.
| | |
|---|---|
| *H04M 3/436* | (2006.01) |
| *H04L 9/06* | (2006.01) |
| *H04W 12/12* | (2021.01) |
| *H04W 12/72* | (2021.01) |
| *H04L 9/00* | (2022.01) |

(52) U.S. Cl.
CPC .............. *H04M 3/436* (2013.01); *H04L 9/06* (2013.01); *H04W 12/12* (2013.01); *H04W 12/72* (2021.01);
(Continued)

(58) Field of Classification Search
CPC ......... H04M 3/436; H04M 2203/6027; H04M 2203/2027; H04L 9/06; H04L 9/50;
(Continued)

(56) References Cited

U.S. PATENT DOCUMENTS 10,182,034 B1 * 1/2019 Koster .............. H04M 3/42059
10,454,878 B2 10/2019 Khan et al.
(Continued)

OTHER PUBLICATIONS

H. Tu, A. Doupé, Z. Zhao and G.-J. Ahn, "SoK: Everyone Hates Robocalls: A Survey of Techniques Against Telephone Spam," 2016 IEEE Symposium on Security and Privacy (SP), 2016, pp. 320-338 (Year: 2016).*

(Continued)

*Primary Examiner* — Sharad Rampuria

(57) ABSTRACT

An innovative method is implemented to determine a robocall and blocks the incoming communication deemed to be a robocall. The method leverages blockchain's shared storage, memory, and ability to transact all information across a network and independently verified and stored on the immutable blockchain. The method takes advantage high-speed cellular network to process each communication with high-speed. Further, the method integrates blockchain encryption, swarm intelligence (SI), artificial intelligence (AI) and machine learning (ML) algorithms, a telecommunication expert knowledge graph (TEKG), and real-time parsing of records to block robocalls and reduce connection delays. All modules can evolve and update themselves with each use of the present invention through various SI, AI, and ML technologies. Additionally, the method includes a localized call-filtering feature based on state and federal laws to ensure the blocking of calls that are prohibited by either federal or state governments thereby facilitating recovery of damages.

21 Claims, 29 Drawing Sheets

(52) U.S. Cl.
CPC ....... *H04L 9/50* (2022.05); *H04M 2203/6027* (2013.01)

(58) Field of Classification Search
CPC ............... H04L 9/3239; H04L 63/1466; H04L 2463/144; H04L 63/0227; H04L 63/08; H04W 12/12; H04W 12/72; H04W 12/122; H04W 12/71; H04W 12/069; H04W 12/088; H04W 12/06; H04W 12/062; H04W 12/065; H04W 12/068; H04W 12/08; H04W 12/082; H04W 12/084; H04W 12/121; H04W 12/086
See application file for complete search history.

(56) References Cited

U.S. PATENT DOCUMENTS

| | | | |
|---|---|---|---|
| 10,582,041 B2 * | 3/2020 | Gallagher | H04M 3/2281 |
| 10,805,458 B1 * | 10/2020 | Grabowski | H04M 3/53308 |
| 2015/0350075 A1 | 12/2015 | Li et al. | |
| 2017/0132615 A1 | 5/2017 | Castinado et al. | |
| 2018/0324299 A1 * | 11/2018 | Sial | H04W 4/16 |
| 2019/0044700 A1 | 2/2019 | Leddy | |
| 2019/0173898 A1 | 6/2019 | Bharrat et al. | |
| 2019/0208418 A1 | 7/2019 | Breu | |
| 2019/0229931 A1 | 7/2019 | Uzelac | |
| 2020/0359221 A1 * | 11/2020 | Uzelac | H04L 63/0236 |
| 2021/0092228 A1 * | 3/2021 | Grabowski | H04M 7/006 |
| 2021/0173711 A1 * | 6/2021 | Crabtree | G06F 16/9024 |

OTHER PUBLICATIONS

Tu, Huahong, et al. "Sok: Everyone hates robocalls: A survey of techniques against telephone spam." 2016 IEEE Symposium on Security and Privacy (SP). IEEE, 2016. (Year: 2016).*

* cited by examiner

METHODS AND SYSTEMS FOR DETECTING DISINFORMATION AND BLOCKING ROBOTIC CALLS

The current application claims a priority to the U.S. Provisional Patent application Ser. No. 62/942,873 filed on Dec. 3, 2019.

STATEMENT AS TO FEDERALLY SPONSORED RESEARCH

This invention was made with Government support under Small Business Innovative Research (SBIR) Grant Number 1938135, awarded by the National Science Foundation. The Government has certain rights to this invention.

FIELD OF THE INVENTION

The present invention relates generally to communication systems and methods. More specifically, the present invention relates to a method and system for robocall determination and blocking that eliminates unwanted calls and communications using technologies such as blockchain, swarm intelligence, machine learning, deep learning, artificial intelligence, natural language processing, and telecommunication expert knowledge graph.

BACKGROUND OF THE INVENTION

A system or method to block unwanted robocalls is in demand. With the growth of new technology that enables thousands of calls to be generated automatically, a great number of unwanted calls are being made daily to thousands of recipients. These automatically generated calls are annoying and can occur at any time without consideration of the receiver's situation or existing laws that prohibit such calls. Additionally, these automated calls, made by machines, are called robocalls and use a computerized auto-dialer to deliver a prerecorded message to any or targeted receivers. Robocallers, which include spammers, scammers and spoofers, leverage artificial intelligence (AI), a synthesized voice (so-called "deepfakes"), and caller ID spoofing to create fraud.

In 2019, Americans received 26.3 billion robocalls. A new monthly record of 5.23 billion robocalls was reached in March 2019 according to the Federal Trade Commission (FTC), which further reports being on track to receive 5.2 million complaints about robocalls in 2019, a 30% increase over 2018. Robocalling scammers rely on cheap technology that works on a large scale, and new schemes are growing smarter, posing an ever-increasing future threat.

Although currently available call-blocking features on users' phones can be used to block calls, robocalls can originate from numbers not previously known to the recipient. Moreover, some robocallers employ technology that spoofs their originating number so that it appears to be a legitimate number, making it difficult to identify robocall numbers.

Customers and businesses that have been adversely affected by robocalling have sought features related to detecting and blocking these calls. However, as with most existing IoT (Internet of Things) platforms, conventional call-blocking systems are generally highly centralized architectures that use a centralized database and suffer from various technical limitations such as vulnerability to cyber-attack and single point of failure.

Because phone numbers are constantly being recycled and can be spoofed, a static, centralized database of blacklisted numbers is of little value. In order to capitalize on laws intended to protect consumers, sharing a list of bad numbers alone is not sufficient to help solve the problem. For example, consumers are entitled to receive $500 in compensation under the Telecommunications Consumer Protection Act (TCPA) if telemarketers use robo-dialers to contact that consumer. If the consumer happens to be in the District of Columbia (DC) or has a DC area code, and the robocall is soliciting the sale of real estate property, the consumer is entitled to an additional $1,000. After a second call from the same telemarketer, the consumer is entitled to another $5,000 in compensation (a total of $6,500). However, most consumers simply ignore the call, thereby forfeiting renumeration. More importantly, ignoring the call deprives other user's protection that would be gained through widespread dissemination of the characteristics of a new and emerging scam.

The Better Business Bureau advises consumers to "avoid answering calls from phone numbers you don't recognize, even if they appear to be local." The Wall Street Journal on Nov. 21, 2019 reported that a caller impersonating a Federal Bureau of Investigation (FBI) agent persuaded a consumer in New York (N.Y.), to drain close to $340,000 from her bank accounts. The caller used what psychologists describe as a reliance on people in authority and kept the consumer in a state of isolation and heightened emotion to cloud her judgment. The caller told the consumer that her Social Security Number had been stolen and that crimes had been committed under her name and persuaded her to transfer assets to accounts he controlled on the pretext of protecting the funds.

The FBI agent scam has persisted in the DC area since at least 2016, and a key factor that led to the victimization of the consumer in NY is lack of prior awareness about the scam. The consumer would have benefited from awareness of the basic characteristics of the scam, namely, 1) FBI agent or other person of authority, 2) isolation, and 3) transfer of assets to another account for protection. After controlling for contemporaneous correlations from mutual friends, the positive effects of widespread dissemination of the characteristics of a scam emanate even from users outside of the consumer's immediate network to inoculate all users in real-time. Thus, information from a complete stranger who was a victim of the FBI scam in DC would have helped the consumer in NY avoid the same scam that resulted in a loss of her life's savings.

In addition, conventional systems attempt to filter calls at the network server level using SHAKEN/STIR technology that is not designed for blocking calls in a communication network, which can cause delays; thus, they are not effective in filtering out unwanted robocalls. Accordingly, there is a need to develop a system to block or reduce robocalls and associated fraud by filtering at the telecommunication device level.

The objective of the present invention is to provide an innovative method and system to solve the aforementioned problems. The present invention integrates technologies such as blockchain, swarm intelligence, machine learning, deep learning, artificial intelligence, natural language processing, and telecommunication expert knowledge graph to offer a secure, efficient, and effective robocall-blocking system.

SUMMARY OF THE INVENTION

An innovative method is designed and implemented to determine a robocall and blocks the incoming communication if the call is a robocall. The method of the present invention leverages blockchain's shared storage, memory, and ability to operate in a "trustless environment", where all information being transacted across the network is independently verified and stored on the immutable blockchain. The robocall determination and blocking method takes advantage of advances in wireless communication technologies including, but not limited to, the fifth generation (5G) cellular network and the wireless mesh communications to facilitate lighting speed of processing each incoming call/communication without the notice of a user. Further, the method integrates blockchain encryption, swarm intelligence (SI), artificial intelligence (AI) and machine learning (ML) algorithms, a telecommunication expert knowledge graph (TEKG), and real-time parsing of records to block robocalls and reduce connection delays. All modules and components including the TEKG can evolve and update themselves with each use of the present invention through various SI, AI, and ML technologies and algorithms.

Additionally, the method includes a localized call-filtering feature based on state and federal laws to ensure the blocking of calls that are prohibited by either federal or state governments thereby facilitating recovery of damages. A robocall determined by the method of the present invention includes, but not limited to, scam/robocall/deepfake/disinformation call (SRDDC), any call that has the characteristics of SRDDC, any call that violates any of existing federal/local laws and regulations, any call that is determined to be a nuisance call, etc. The method handles any call, interchangeable with "communication" including, but not limited to a telephone call, a text message, a video message, or any other suitable communication between two or more communication devices.

Further, the method allows a caregiver, who is a user of the present invention, to safely and securely handle and/or manage robocalls for a specific user who may have diminishing capacity and/or capability. The method links the special user's personal computing (PC) device or phone to a corresponding PC device of the caregiver, and directs a suspicious call for communication with the special user to the caregiver for handling using the present invention.

DETAIL DESCRIPTIONS OF THE INVENTION

All illustrations of the drawings are for the purpose of describing selected versions of the present invention and are not intended to limit the scope of the present invention.

As can be seen in FIG. 1 to FIG. 29, the present invention provides a method and system that determines a robocall and blocks the incoming communication if the call is a robocall. The method of the present invention leverages blockchain's shared storage, memory, and ability to operate in a "trustless environment", where all information being transacted across the network is independently verified and stored on the immutable blockchain, advances in wireless communication technologies including, but not limited to, the fifth generation (5G) cellular network and the wireless mesh communications, blockchain encryption, swarm intelligence, artificial intelligence (AI) and machine learning algorithms, and real-time parsing of records to block robocalls and reduce connection delays. Additionally, the method includes a localized call-filtering feature based on state and federal laws to ensure the blocking of calls that are prohibited by either federal or state governments thereby facilitating recovery of damages. A robocall determined by the method of the present invention includes, but is not limited to, scam/robocall/deepfake/disinformation call (SRDDC), any call that has the characteristics of SRDDC, any call that violates any of existing federal/local laws and regulations, any call that is determined to be a nuisance call, etc. A call, interchangeable with "communication" includes, but is not limited to, a telephone call, a text message, a short message service call/message, a video message, or any other suitable communication between two or more communication devices.

Figure 1:
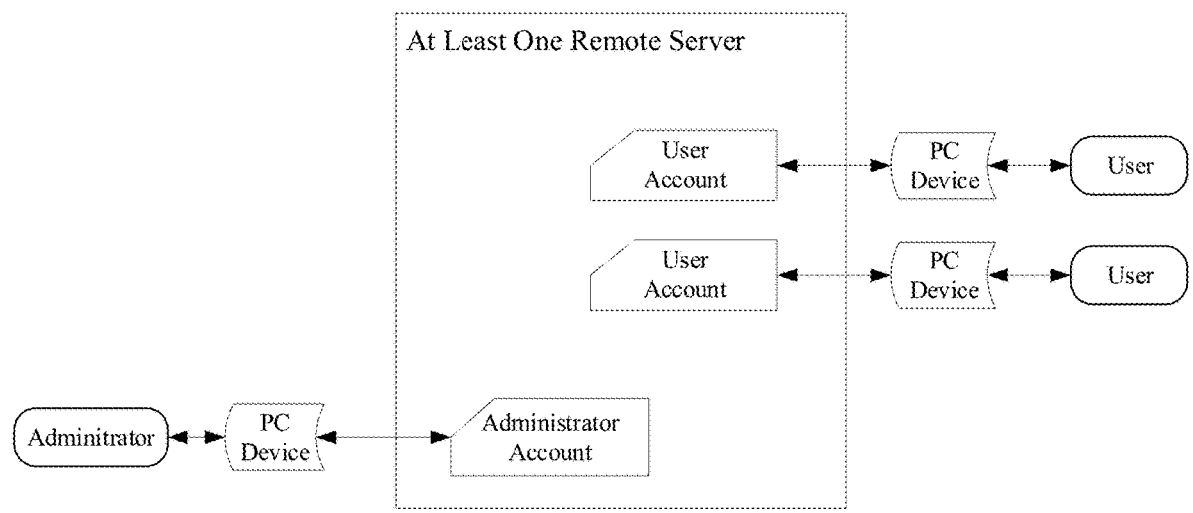
FIG. 1 is a block diagram illustrating the system overview of the present invention.
Figure 2:
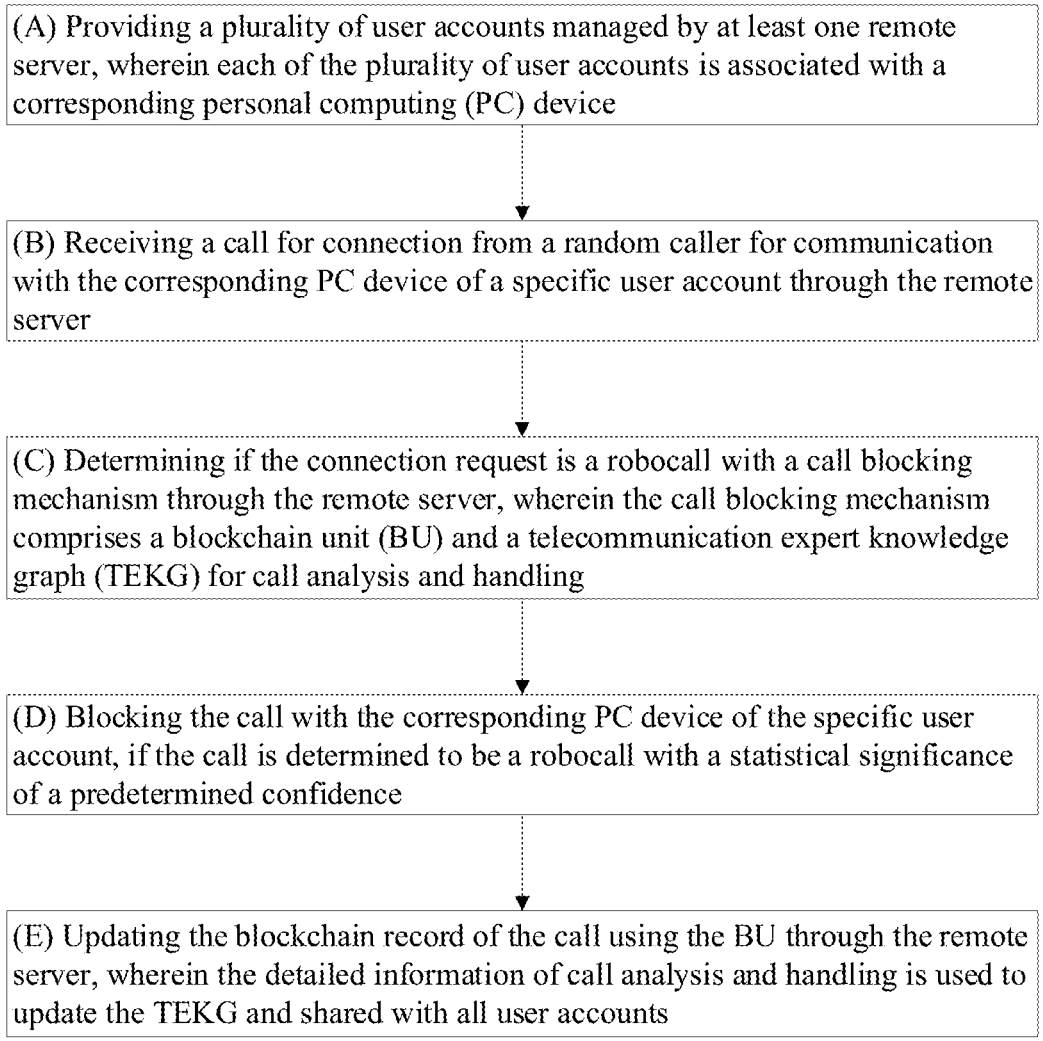
FIG. 2 is a flowchart for the overall process followed by the method of the present invention.

As can be seen in FIG. 1, the present invention provides an innovative system and method to determine whether or not an incoming communication is a robocall and block the robocall without having to alert a user. To accomplish this, the method of the present invention associates each of the plurality of users with a unique user account from a plurality of user accounts that are managed by at least one remote server (Step A), as seen in FIG. 2. Each of the plurality of user accounts is associated with a corresponding personal computing (PC) device. The corresponding PC device allows a user to interact with the present invention and can be, but is not limited to, phone, cellular phone, smartphone, smart watch, cloud PC, cloud device, network device, personal digital assistant (PDA), laptop, desktop, server, terminal PC, or tablet PC, etc. The users of the user accounts may include relevant parties such as, but are not limited to, individuals, network subscribers, cellular service subscribers, network providers, cellular service providers, managers, officials, business owners, consumers, companies, corporations, network companies, cellular companies, government entities, administrators, etc. Further, the at least one remote server is used to manage the robocall determination and blocking platform for the plurality of user accounts. The remote server can be managed through an administrator account by an administrator as seen in FIG. 1. The administrator who manages the remote server includes, but is not limited to, owner, service provider, manager, technician, engineer, system engineer, system specialist, software engineer, information technology (IT) engineer, IT professional, IT manager, IT consultant, service desk professional, service desk manager, consultant, executive officer, chief operating officer, chief technology officer, chief executive officer, president, cellular provider, network provider, network administrator, company, corporation, organization, etc. Moreover, the remote server is used to execute a number of internal software processes and store data for the present invention. The software processes may include, but are not limited to, server software programs, web-based software applications or browsers embodied as, for example, but not limited to, websites, web applications, desktop applications, cloud applications, and mobile applications compatible with a corresponding user PC device. Additionally, the software processes may store data into internal databases and communicate with external databases, which may include, but are not limited to, telephone directory databases, government law/regulation/rule databases, robocall databases, databases maintaining data about PC devices, databases maintaining regulations/laws regarding robocalls, databases maintaining cellular/network services/providers, etc. The interaction with external databases over a communication network may include, but is not limited to, the Internet.

As can be seen in FIG. 2, the overall process of the robocall determination and blocking method of the present invention receives a call for connection from a random caller for communication with the corresponding PC device of a specific user account through the remote server (Step B). More specifically, the method receives a call from a random caller, which may include, but is not limited to, user, any subscriber of the network, non-subscriber, any user with a PC device, etc. Additionally, the call can include, but is not limited to a telephone call, a text message, a video message, etc. Subsequently, the method determines if the connection request is a robocall with a call blocking mechanism through the remote server, wherein the call blocking mechanism comprises a blockchain unit (BU) and a telecommunication expert knowledge graph (TEKG) for call analysis and handling (Step C). More specifically, the method uses the call blocking mechanism to determine if the incoming call/communication is a robocall through the BU and TEKG. The BU uses a blockchain record for every incoming call/communication to track the status, record any information related to the call/communication from receipt to disposition/blocking, make the blockchain available on the robocall determination/blocking platform/system, and distribute the call/communication's blockchain to the plurality of user accounts. The TEKG is the core knowledge center that functions like a brain or heart of the system. The TEKG includes, but is not limited to, various databases, decision tree graphs, expert knowledge, etc., all of which can evolve and make updates through the use of various technologies, include, but are not limited to, machine learning, deep learning, artificial intelligence, natural language processing, meta data processing, neural network, etc.

Further, the method blocks the call with the corresponding PC device of the specific user account, if the call is determined to be a robocall with a statistical significance of a predetermined confidence (Step D). Using various pieces of information of the incoming call/communication and technologies implemented in the call blocking mechanism, the method makes determination if the incoming call/communication is a robocall or not with the predetermined confidence. In the preferred embodiment of the present invention, the predetermined confidence includes, but is not limited to, a statistical significance of 97%. The actual blocking is achieved through the fundamental call-blocking function of the system and method of the present invention, and/or the corresponding PC device of the specific user. Subsequently, the method updates the blockchain record of the call using the BU through the remote server, wherein the detailed information of call analysis and handling is used to update the TEKG and shared with all user accounts (Step E). With the advantages and benefits of distributed ledger records of the blockchain technology, all specific information related to the incoming call/communication from the random call is irrevocably recorded, saved, and distributed across the robocall determination/blocking platform. Additionally, the blockchain of the incoming call/communication from the random call is used to update the TEKG, which provides more up-to-date information for future incoming communications for any user of the present invention.

Figure 3:
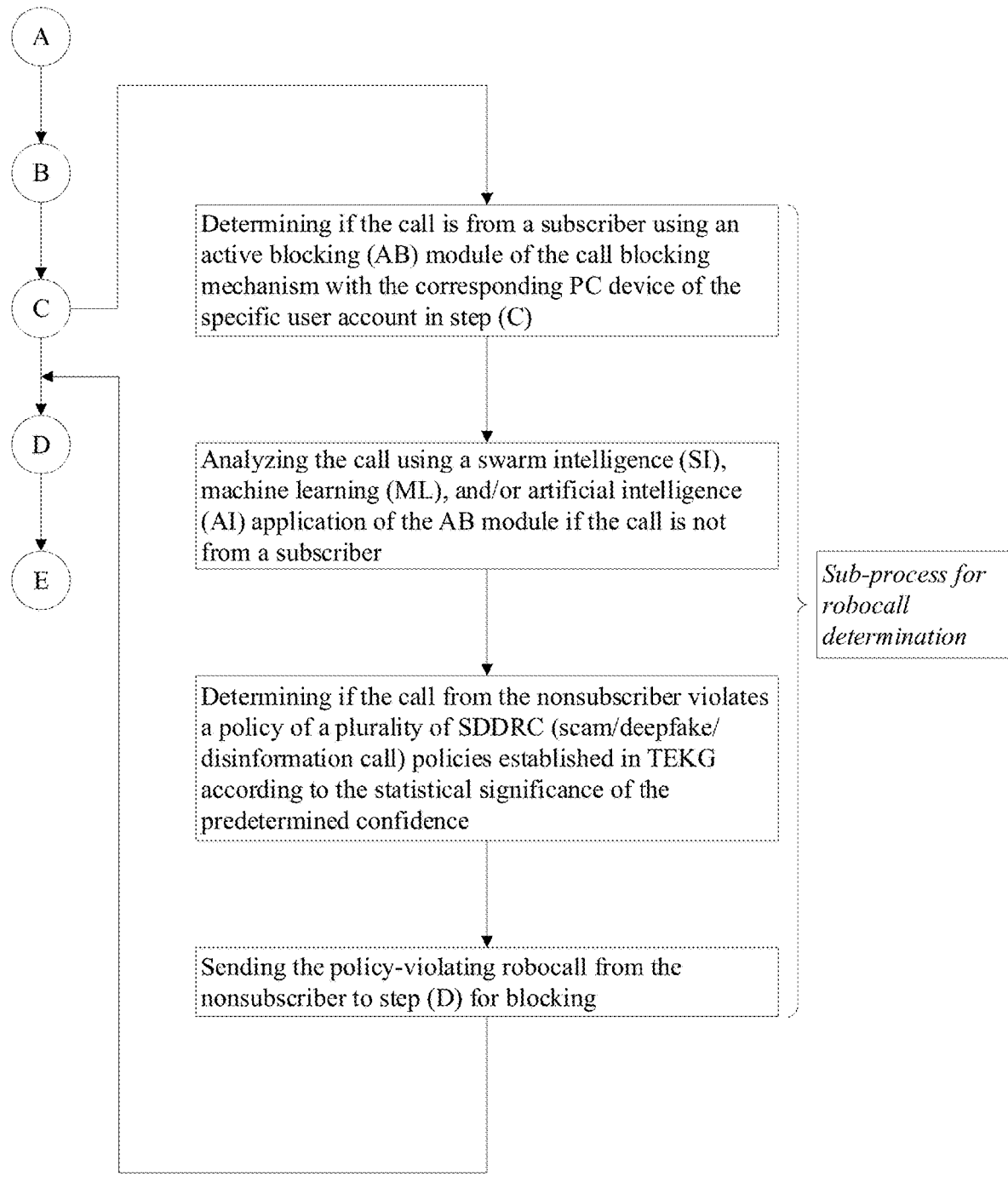
FIG. 3 is a flowchart for a sub-process for robocall determination of the present invention, wherein an active blocking module (BU) is used in a call-blocking mechanism.

As can be seen in FIG. 3, the method of the present invention provides a sub-process for robocall determination. More specifically, the method determines if the call is from a subscriber using an active blocking (AB) module of the call blocking mechanism with the corresponding PC device of the specific user account in Step C. Subsequently, the method analyzes the call using a swarm intelligence (SI), machine learning (ML), and/or artificial intelligence (AI) application of the AB module if the call is not from a subscriber, and determines if the call from the nonsubscriber violates a policy of a plurality of SDDRC (scam/deepfake/disinformation call) policies established in TEKG according to the statistical significance of the predetermined confidence. Further, the method sends the policy-violating robocall from the nonsubscriber to Step D for blocking. The AB module of the call blocking mechanism matches the caller of the incoming call/communication with a plurality of subscribers, which includes, but is not limited to, the plurality of user accounts of the present invention, any network subscriber, etc. In any case that the random caller is not a subscriber, the AB module analyzes the content of the incoming call/communication using SI, ML, AI, and TEKG to determine if the incoming call/communication violates any policy of the plurality of SDDRC policies. When the determination of the incoming call/communication is a robocall with the predetermined confidence, the method blocks the incoming call/communication and updates the blockchain of this incoming call/communication.

Figure 4:
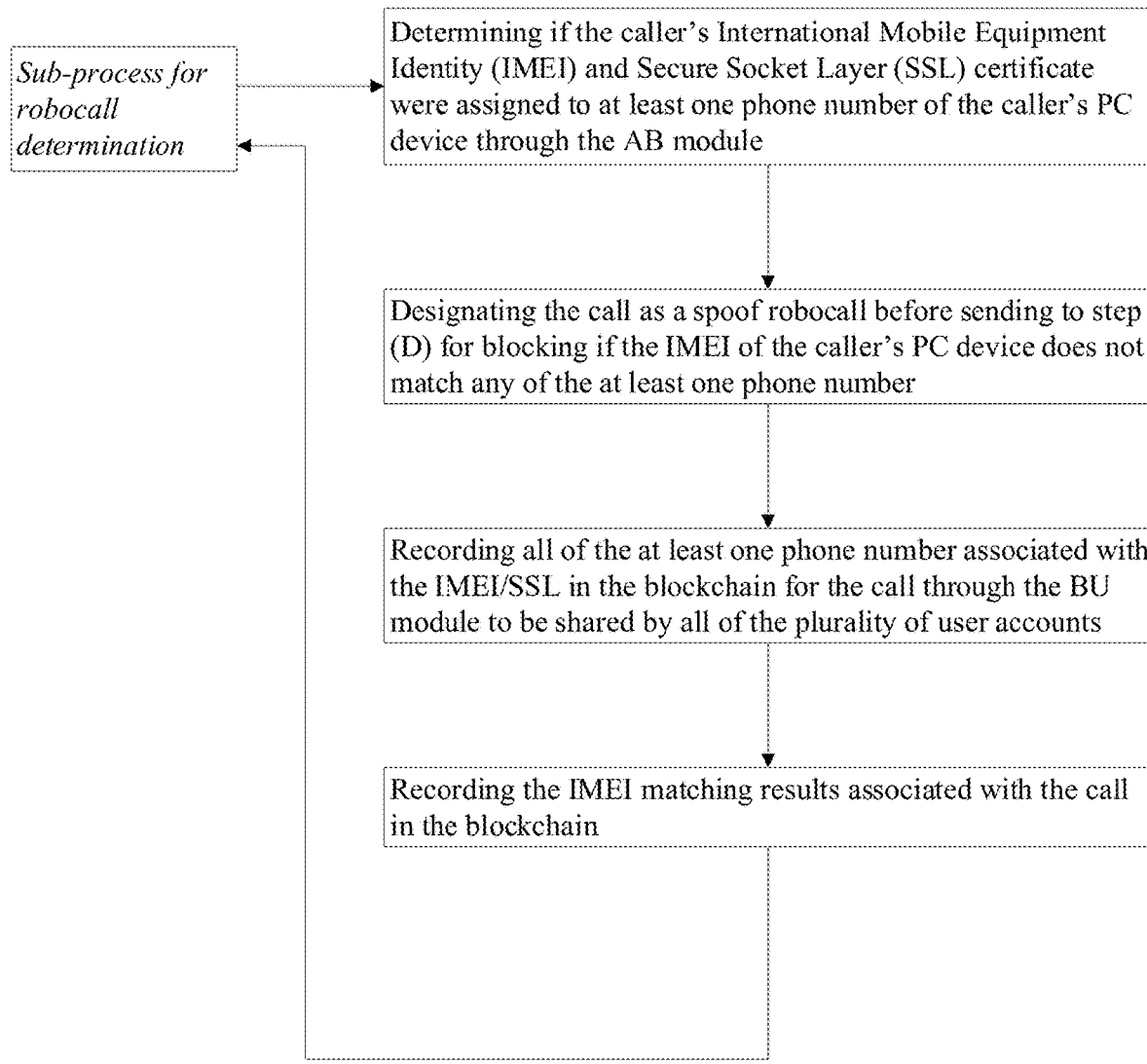
FIG. 4 is a flowchart for an alternative embodiment of the sub-process for robocall determination of the present invention, wherein the active blocking (AB) module is used in the call-blocking mechanism to verify the identification of a caller.

As can be seen in FIG. 4, in an alternative embodiment of the present invention, the method provides a sub-process for robocall determination. More specifically, the method determines if the caller's International Mobile Equipment Identity (IMEI) and Secure Socket Layer (SSL) certificate were assigned to at least one phone number of the caller's PC device through the AB module. Subsequently, the method designates the call as a spoof robocall before sending to Step D for blocking if the IMEI of the caller's PC device does not match any of the at least one phone number, and records all of the at least one phone number associated with the IMEI/SSL in the blockchain for the call through the BU module to be shared by all of the plurality of user accounts. Further, the method records the IMEI matching results associated with the call in the blockchain.

Figure 5:
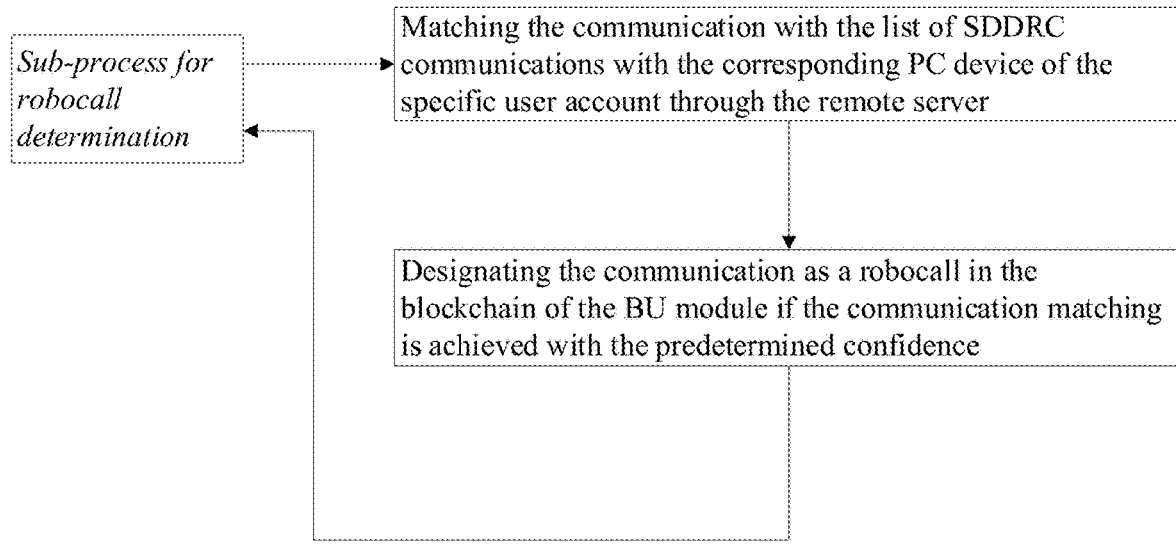
FIG. 5 is a flowchart for another embodiment of the sub-process for robocall determination of the present invention, wherein a call/communication is matched with a list of robocalls.

As can be seen in FIG. 5, in another embodiment of the present invention, the method provides a sub-process for robocall determination. More specifically, the method matches the communication with the list of SDDRC communications with the corresponding PC device of the specific user account through the remote server. Subsequently, the method designates the communication as a robocall in the blockchain of the BU module if the communication matching is achieved with the predetermined confidence.

Figure 6:
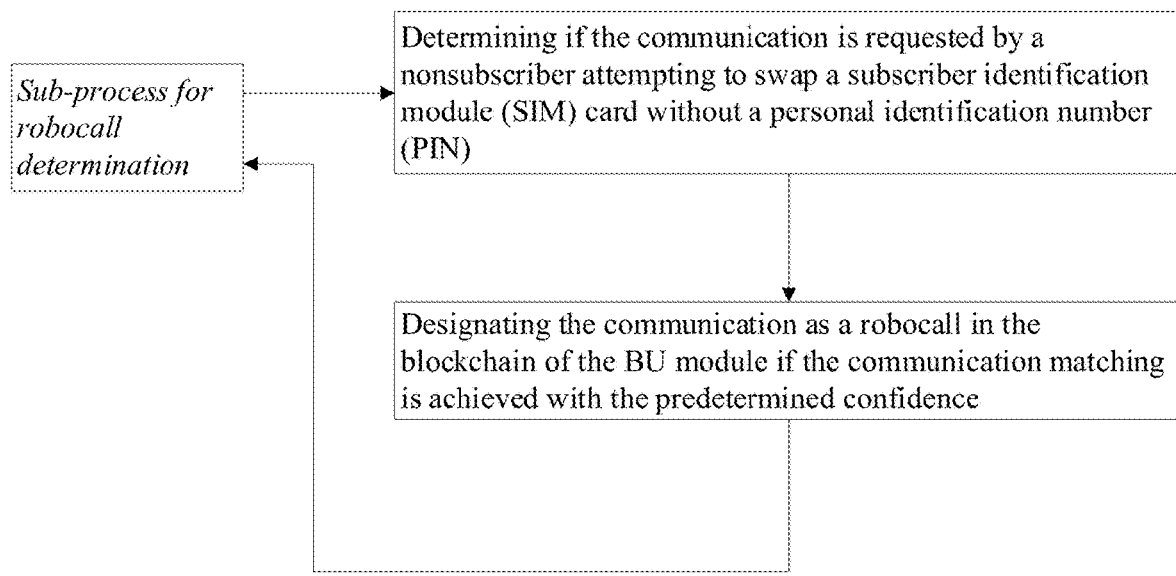
FIG. 6 is a flowchart for another embodiment of the sub-process for robocall determination of the present invention, wherein the phone number of the caller is checked for validity.

As can be seen in FIG. 6, in another embodiment of the present invention, the method provides a sub-process for robocall determination. More specifically, the method determines if the communication is requested by a nonsubscriber attempting to swap a subscriber identification module (SIM) card without a personal identification number (PIN). Subsequently, the method designates the communication as a robocall in the blockchain of the BU module if the communication matching is achieved with the predetermined confidence.

Figure 7:
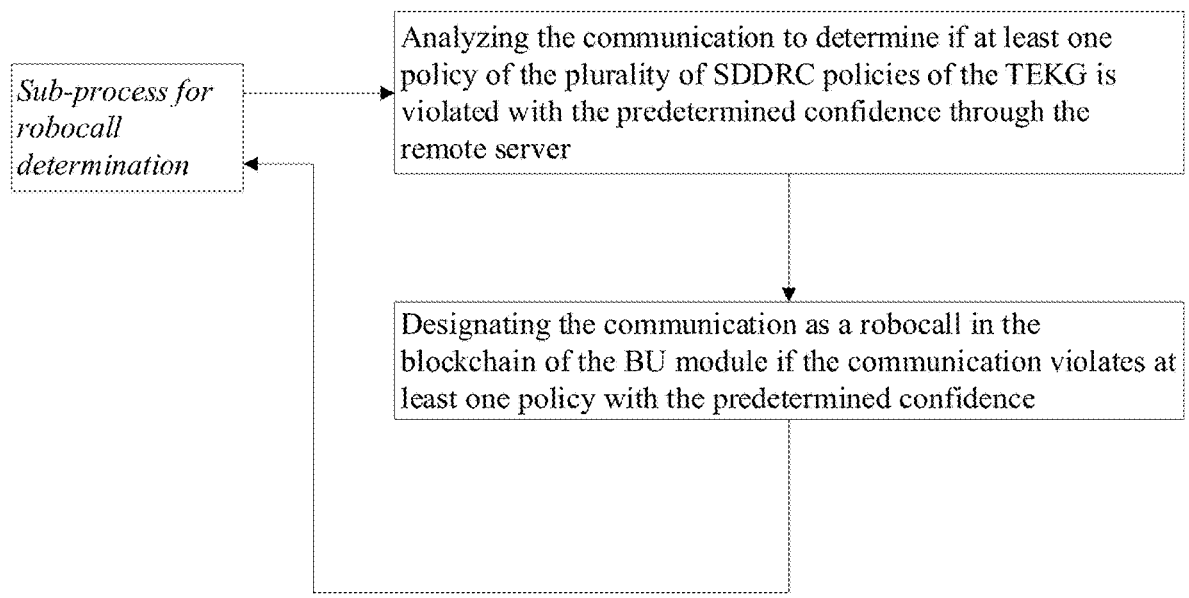
FIG. 7 is a flowchart for another embodiment of the sub-process for robocall determination of the present invention, wherein the call is analyzed using a telecommunication expert knowledge graph (TEKG).

As can be seen in FIG. 7, in another embodiment of the present invention, the method provides a sub-process for robocall determination. More specifically, the method analyzes the communication to determine if at least one policy of the plurality of SDDRC policies of the TEKG is violated with the predetermined confidence through the remote server. Subsequently, the method designates the communication as a robocall in the blockchain of the BU module if the communication violates at least one policy with the predetermined confidence.

Figure 8:
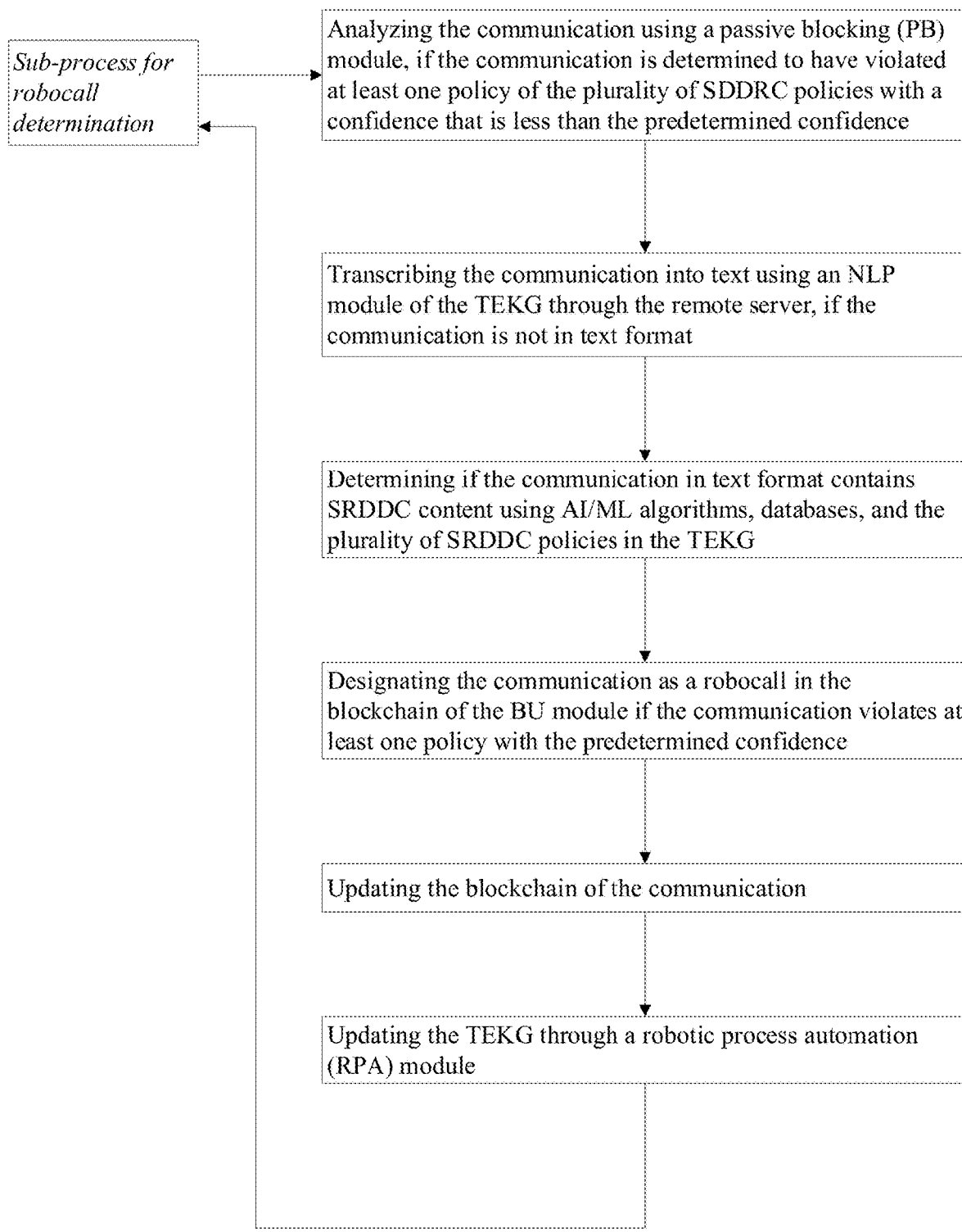
FIG. 8 is a flowchart for another embodiment of the sub-process for robocall determination of the present invention, wherein a passive blocking module is used in the call-blocking mechanism.

As can be seen in FIG. 8, in another embodiment of the present invention, the method provides a sub-process for robocall determination. More specifically, the method analyzes the communication using a passive blocking (PB) module, if the communication is determined to have violated at least one policy of the plurality of SDDRC policies with a confidence that is less than the predetermined confidence. Subsequently, the method transcribes the communication into text using an NLP module of the TEKG through the remote server, if the communication is not in text format. Next, the method determines if the communication in text format contains SRDDC content using AI/ML algorithms, databases, and the plurality of SRDDC policies in the TEKG, and designating the communication as a robocall in the blockchain of the BU module if the communication violates at least one policy with the predetermined confidence. Further, the method updates the blockchain of the communication and the TEKG through a robotic process automation (RPA) module.

Figure 9:
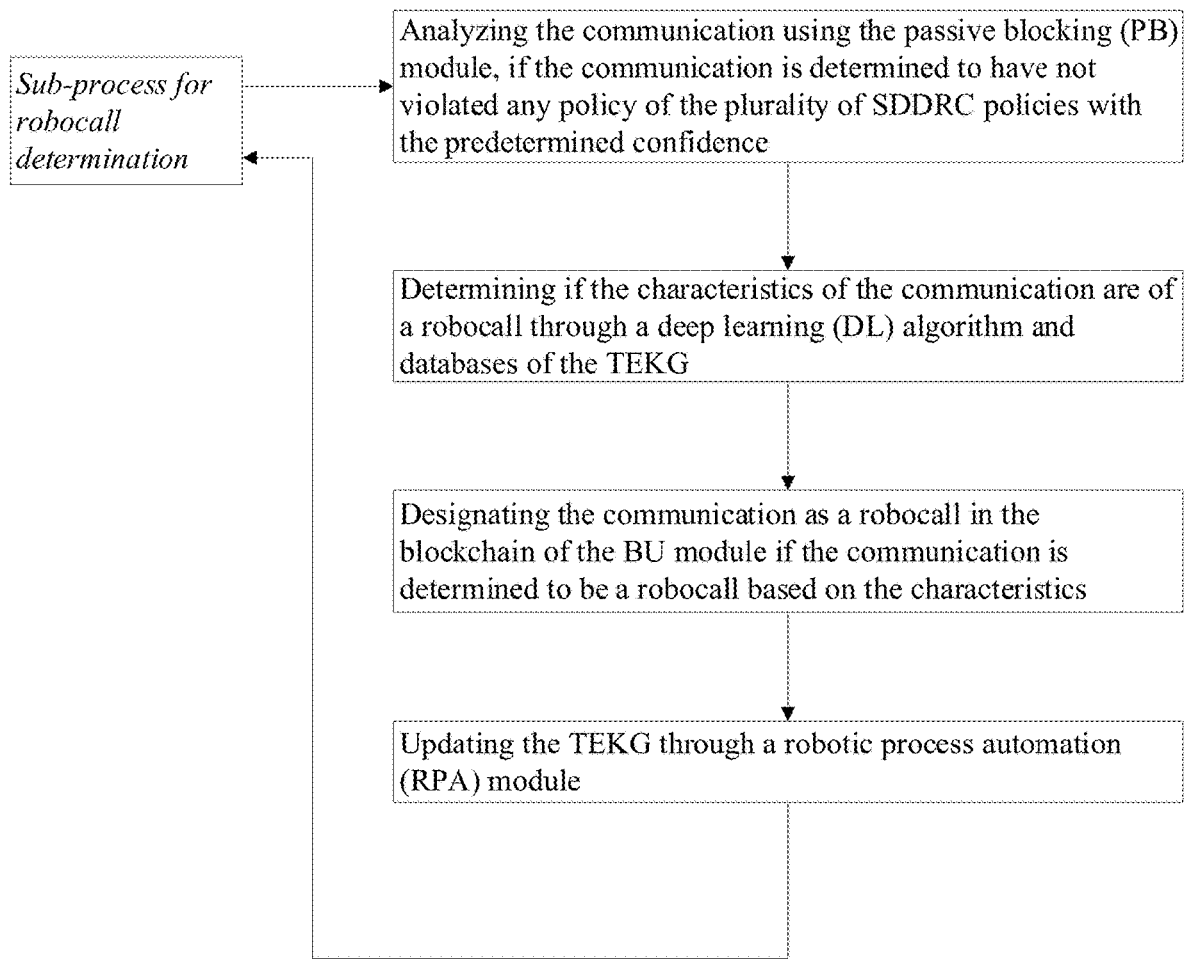
FIG. 9 is a flowchart for another embodiment of the sub-process for robocall determination of the present invention, wherein a passive blocking (BU) module is used determine the characteristics of a robocall.

As can be seen in FIG. 9, in another embodiment of the present invention, the method provides a sub-process for robocall determination. More specifically, the method analyzes the communication using the passive blocking (PB) module, if the communication is determined to have not violated any policy of the plurality of SDDRC policies with the predetermined confidence. Subsequently, the method determines if the characteristics of the communication are of a robocall through a deep learning (DL) algorithm and databases of the TEKG. Next, the method designates the communication as a robocall in the blockchain of the BU module if the communication is determined to be a robocall based on the characteristics. Further, the method updates the TEKG through a robotic process automation (RPA) module.

Figure 10:
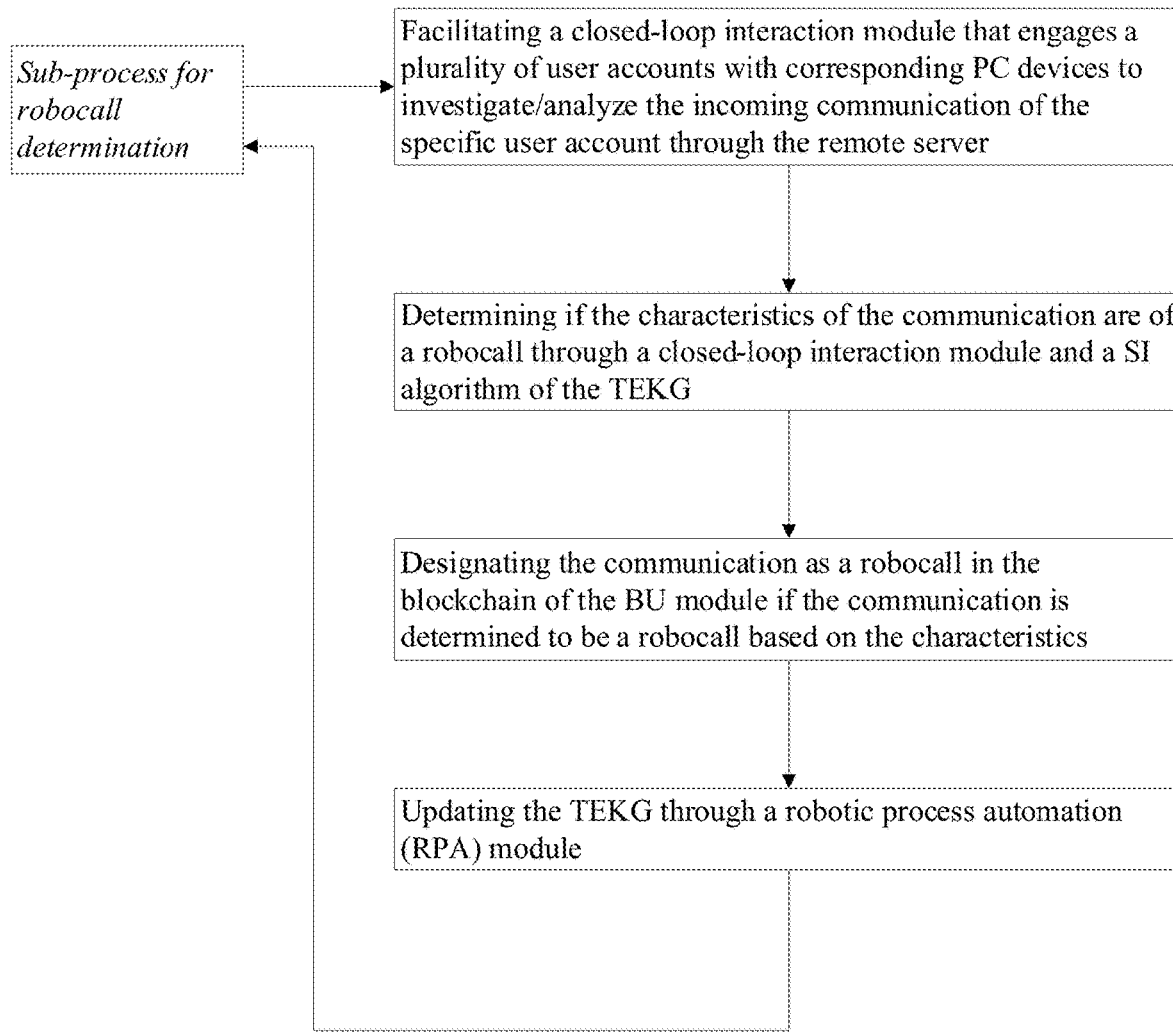
FIG. 10 is a flowchart for another embodiment of the sub-process for robocall determination of the present invention, wherein a closed-loop interaction module is used to determine the characteristics of a robocall.

As can be seen in FIG. 10, in another embodiment of the present invention, the method provides a sub-process for robocall determination. More specifically, the method facilitates a closed-loop interaction module that engages a plurality of user accounts with corresponding PC devices to investigate/analyze the incoming communication of the specific user account through the remote server. Subsequently, the method determines if the characteristics of the communication are of a robocall through a closed-loop interaction module and a SI algorithm of the TEKG. Next, the method designates the communication as a robocall in the blockchain of the BU module if the communication is determined to be a robocall based on the characteristics. Further, the method updates the TEKG through a robotic process automation (RPA) module.

Figure 11:
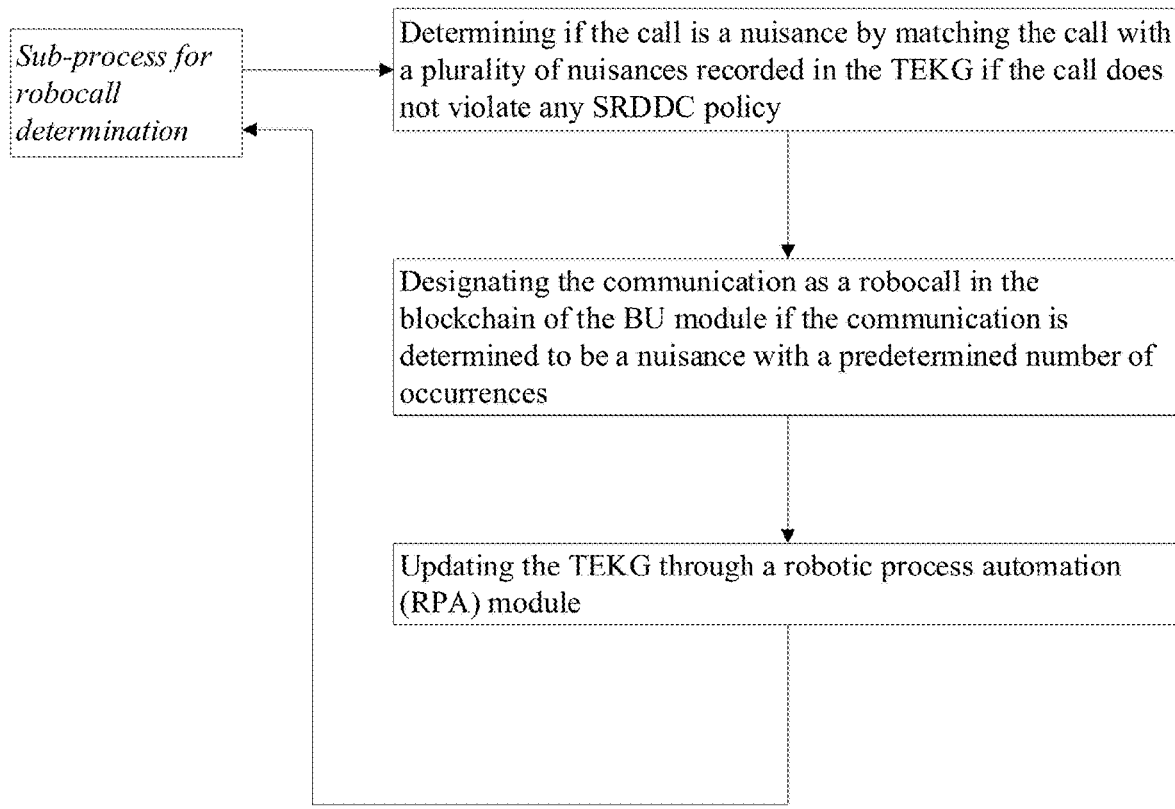
FIG. 11 is a flowchart for another embodiment of the sub-process for robocall determination of the present invention, wherein a nuisance call is determined and blocked.

As can be seen in FIG. 11, in another embodiment of the present invention, the method provides a sub-process for robocall determination. More specifically, the method determines if the call is a nuisance by matching the call with a plurality of nuisances recorded in the TEKG if the call does not violate any SRDDC policy. Subsequently, the method designates the communication as a robocall in the blockchain of the BU module if the communication is determined to be a nuisance with a predetermined number of occurrences. Further, the method updates the TEKG through a robotic process automation (RPA) module.

Figure 12:
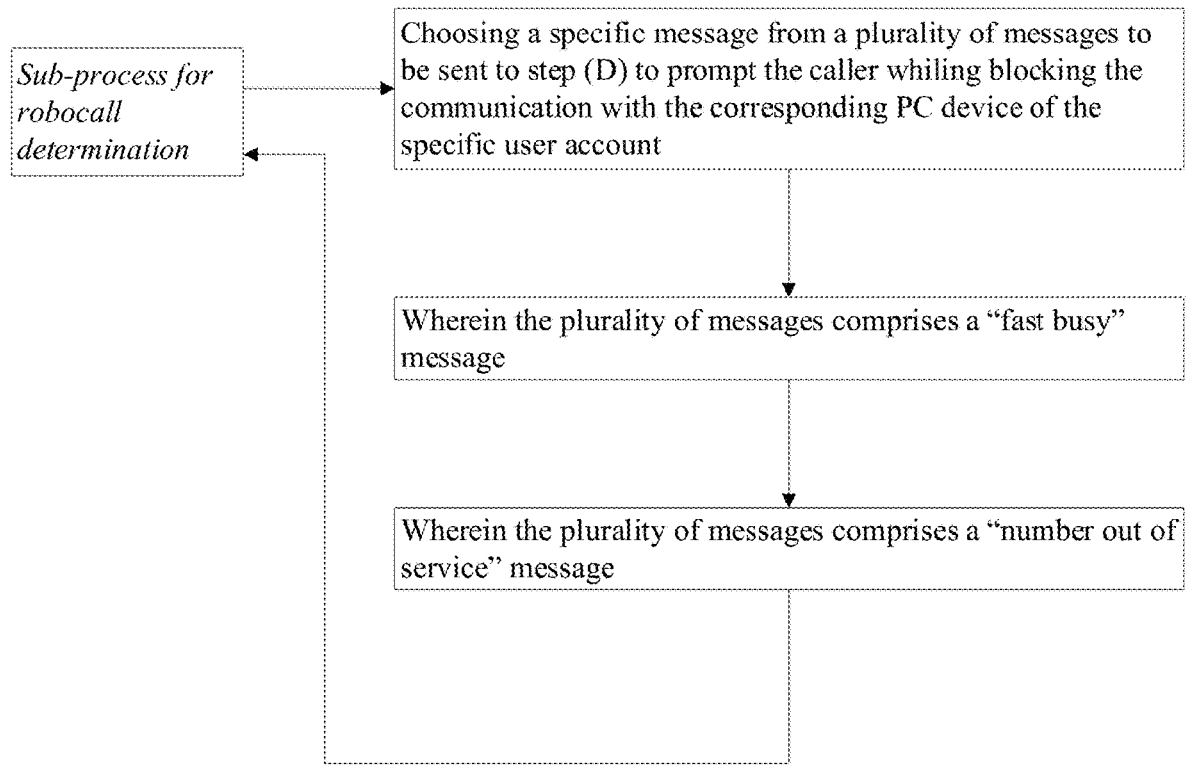
FIG. 12 is a flowchart for another embodiment of the sub-process for robocall determination of the present invention, wherein a call-blocking message may be responded to a caller.

As can be seen in FIG. 12, in another embodiment of the present invention, the method provides a sub-process for robocall determination. More specifically, the method chooses a specific message from a plurality of messages to be sent to Step D to prompt the caller whiling blocking the communication with the corresponding PC device of the specific user account. Additionally, the plurality of messages comprises a "fast busy" message, a "number out of service" message, and any other suitable message, etc.

Figure 13:
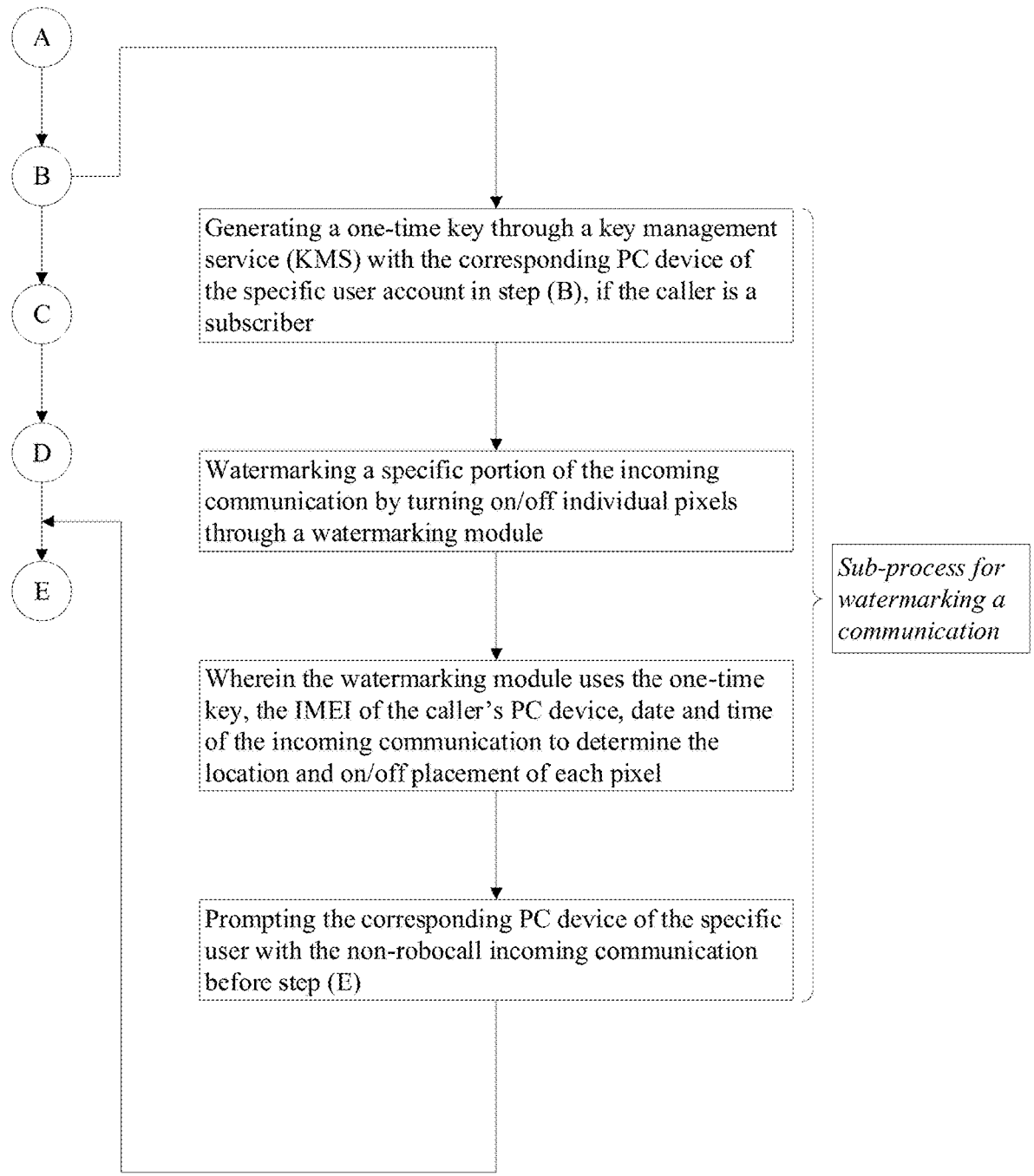
FIG. 13 is a flowchart for a sub-process for watermarking the incoming call/communication of the present invention.

As can be seen in FIG. 13, the method of the present invention provides a sub-process for watermarking a communication. More specifically, the method generates a one-time key through a key management service (KMS) with the corresponding PC device of the specific user account in Step B, if the caller is a subscriber. Subsequently, the method watermarks a specific portion of the incoming communication by turning on/off individual pixels through a watermarking module. The watermarking module uses the one-time key, the IMEI of the caller's PC device, date and time of the incoming communication to determine the location and on/off placement of each pixel. Further, the method prompts the corresponding PC device of the specific user with the non-robocall incoming communication before Step E. The specific portion of the incoming communication being watermarked includes, but is not limited to, first number of seconds of the communication such as five (5) seconds, seven (7) seconds, or any portion of any suitable period of time.

Figure 14:
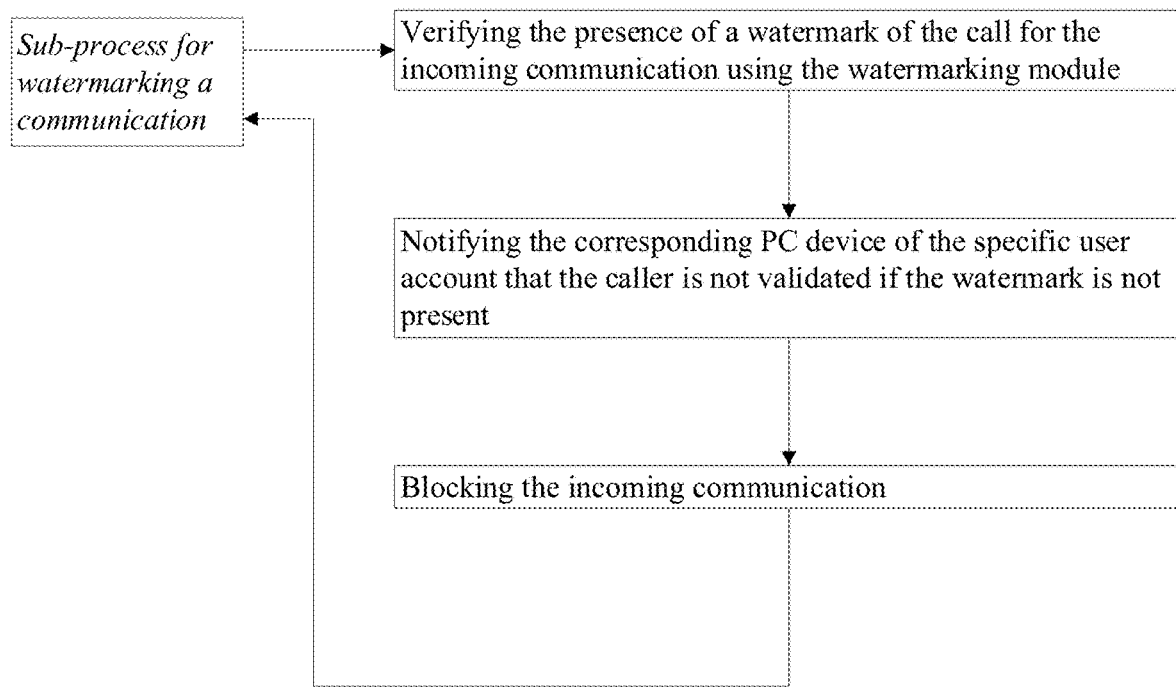
FIG. 14 is a flowchart for an alternative embodiment of the sub-process for watermarking the incoming call/communication of the present invention, wherein the presence of a watermark is verified.
Figure 15:
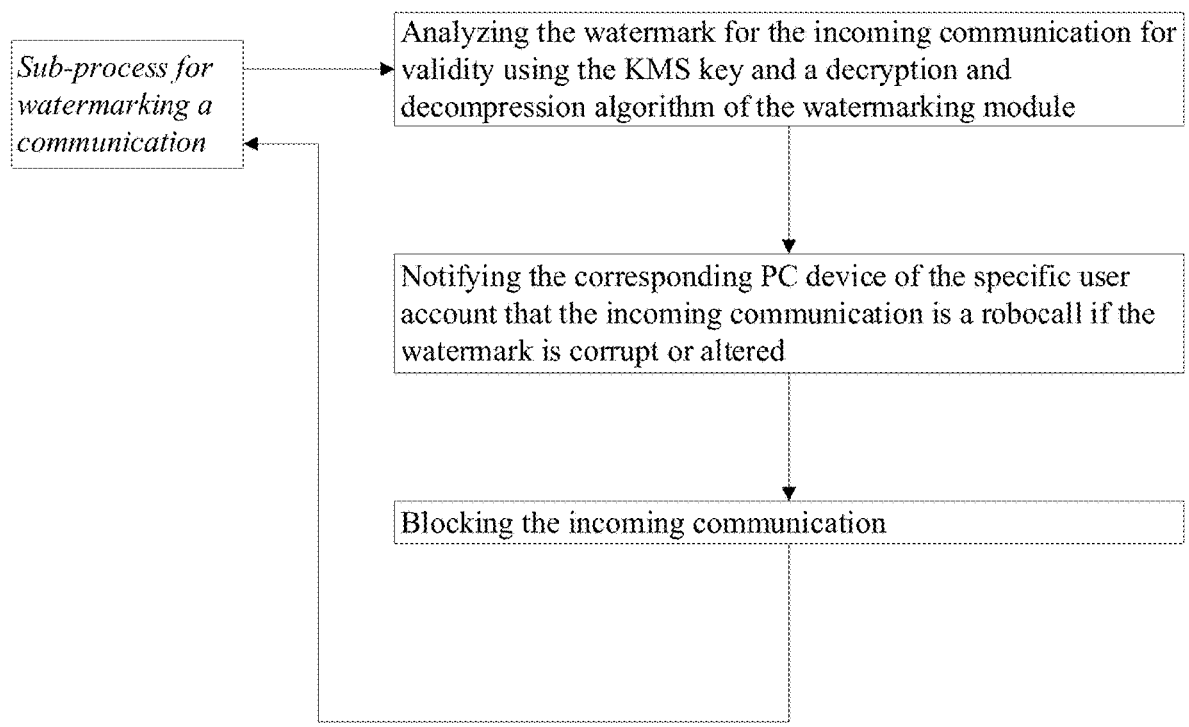
FIG. 15 is a flowchart for another embodiment of the sub-process for watermarking the incoming call/communication of the present invention, wherein the watermark is validated.
Figure 16:
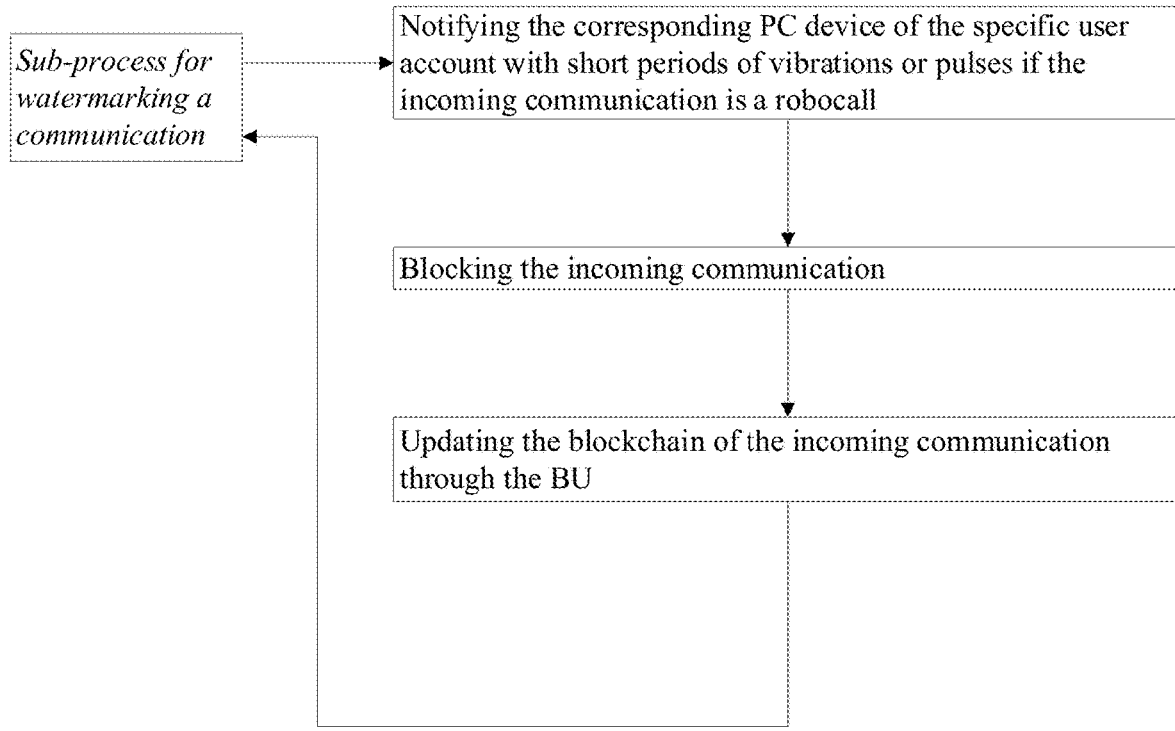
FIG. 16 is a flowchart for another embodiment of the sub-process for watermarking the incoming call/communication of the present invention, wherein a specific user is notified through vibrations and pulses.

As can be seen in FIG. 14, in an alternative embodiment, the method of the present invention provides the sub-process for watermarking a communication. More specifically, the method verifies the presence of a watermark of the call for the incoming communication using the watermarking module. Subsequently, the method notifies the corresponding PC device of the specific user account that the caller is not validated if the watermark is not present. Then, the method blocks the incoming communication. As can be seen in FIG. 15, in another embodiment, the method analyzes the watermark for the incoming communication for validity using the KMS key and a decryption and decompression algorithm of the watermarking module. The method notifies the corresponding PC device of the specific user account that the incoming communication is a robocall if the watermark is corrupt or altered. Subsequently, the method blocks the incoming communication. Thus, any incoming call/communication that does not have a valid watermark is blocked. As can be seen in FIG. 16, in another embodiment, the method notifies the corresponding PC device of the specific user account with short periods of vibrations or pulses if the incoming communication is a robocall. Then, the method blocks the incoming communication and updates the blockchain of the incoming communication through the BU.

Figure 17:
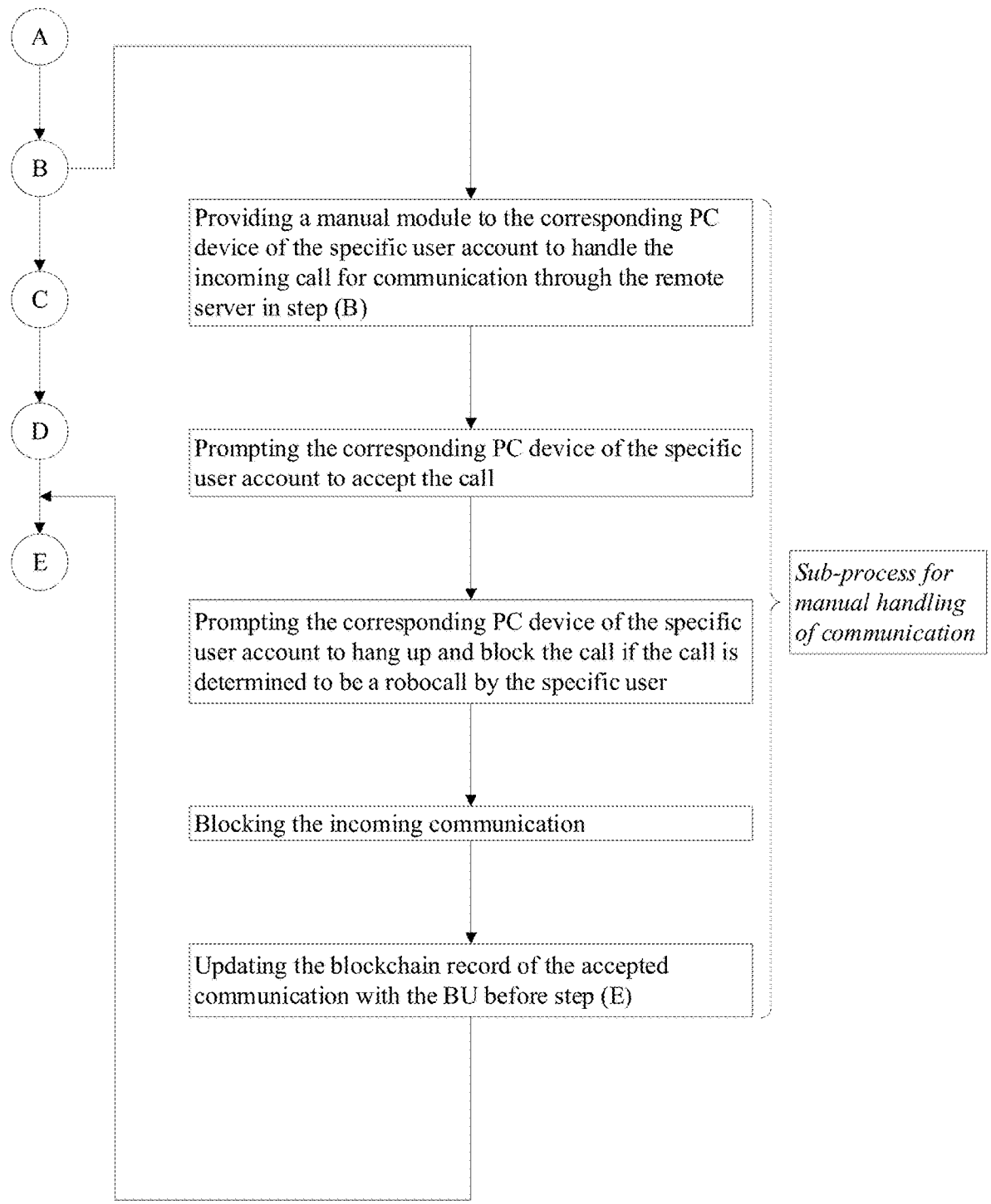
FIG. 17 is a flowchart for a sub-process for manually handling the incoming call/communication of the present invention.
Figure 18:
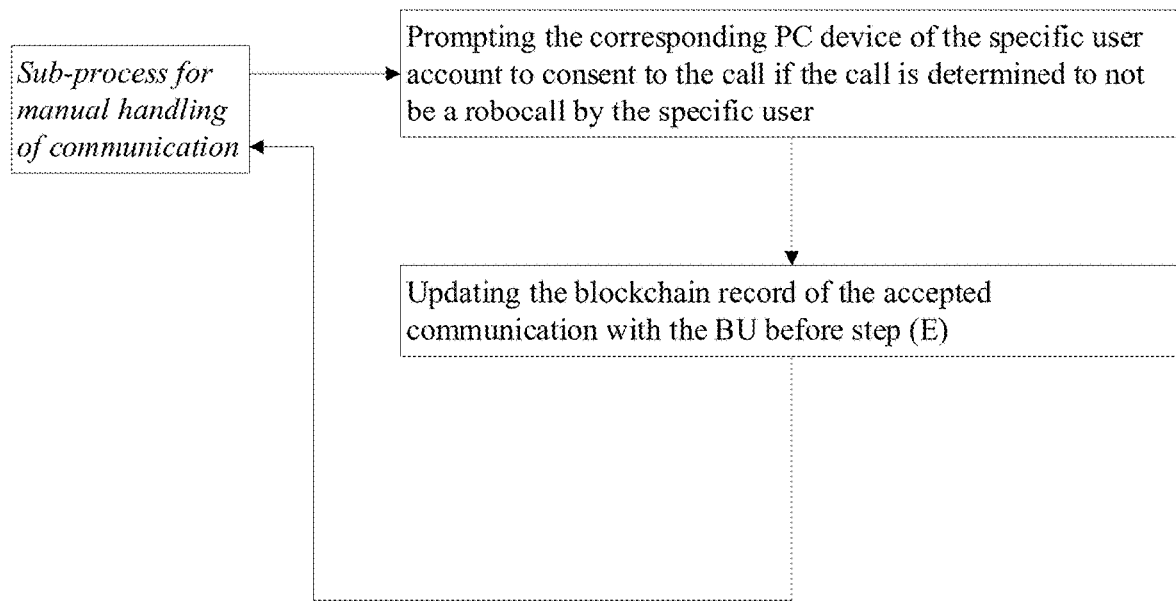
FIG. 18 is a flowchart for an alternative embodiment of the sub-process for manually handling the incoming call/communication of the present invention, wherein the method prompts the specific user to consent to the non-robocall communication.

As can be seen in FIG. 17, the method of the present invention provides a sub-process for manually handling a communication. More specifically, the method provides a manual module to the corresponding PC device of the specific user account to handle the incoming call for communication through the remote server in Step B. Subsequently, the method prompts the corresponding PC device of the specific user account to accept the call. Additionally, the method prompts the corresponding PC device of the specific user account to hang up and block the call if the call is determined to be a robocall by the specific user. Then, the method blocks the incoming communication and updates the blockchain record of the accepted communication with the BU before Step E. As can be seen in FIG. 18, in an alternative embodiment, the method prompts the corresponding PC device of the specific user account to consent to the call if the call is determined not to be a robocall by the specific user. Subsequently, the method updates the blockchain record of the accepted communication with the BU before Step E.

Figure 19:
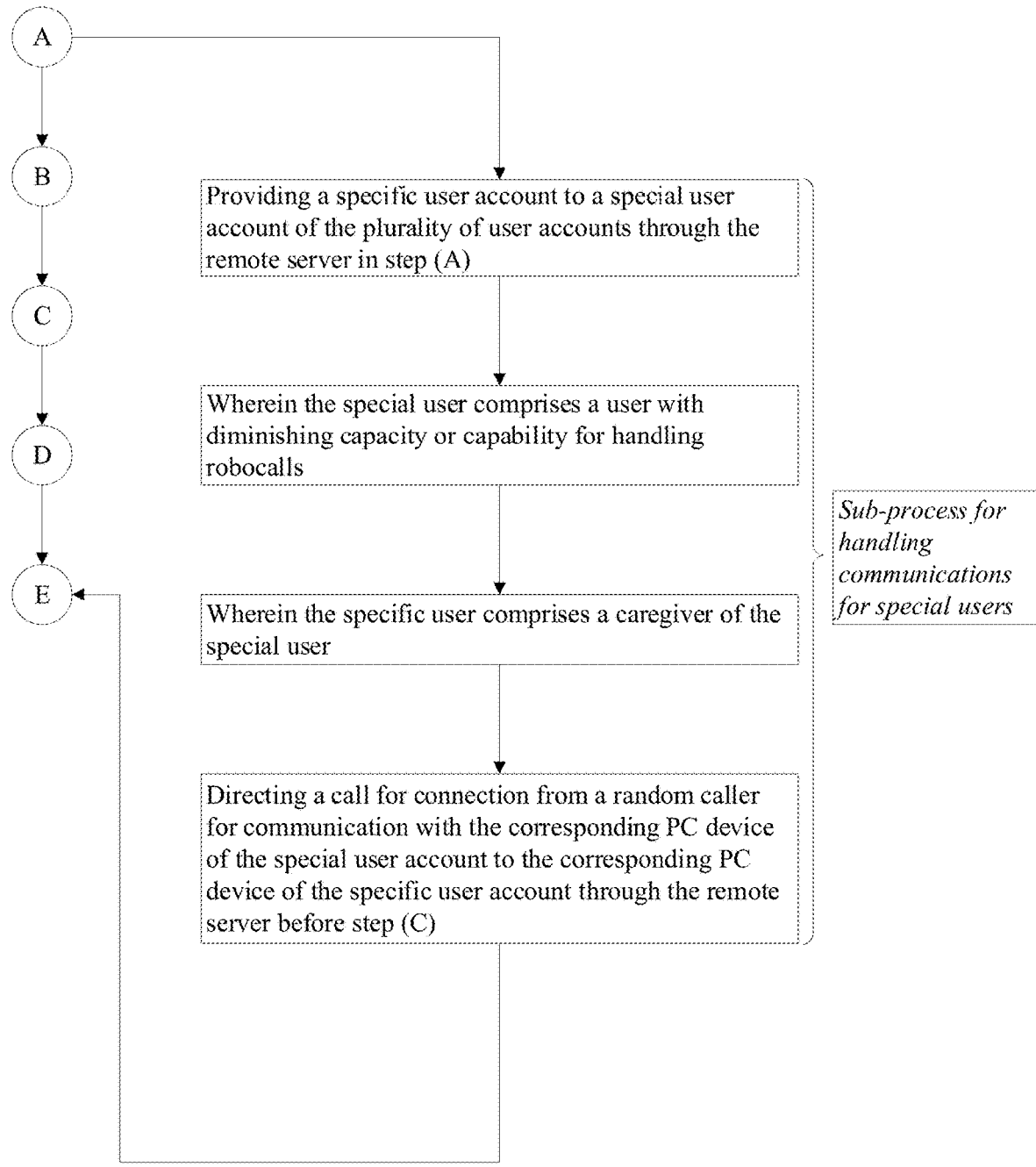
FIG. 19 is a diagrammatic view showing one embodiment of the device level BU and cloud level BU providing an interface between the AB model and PB model of the present invention.
Figure 20:
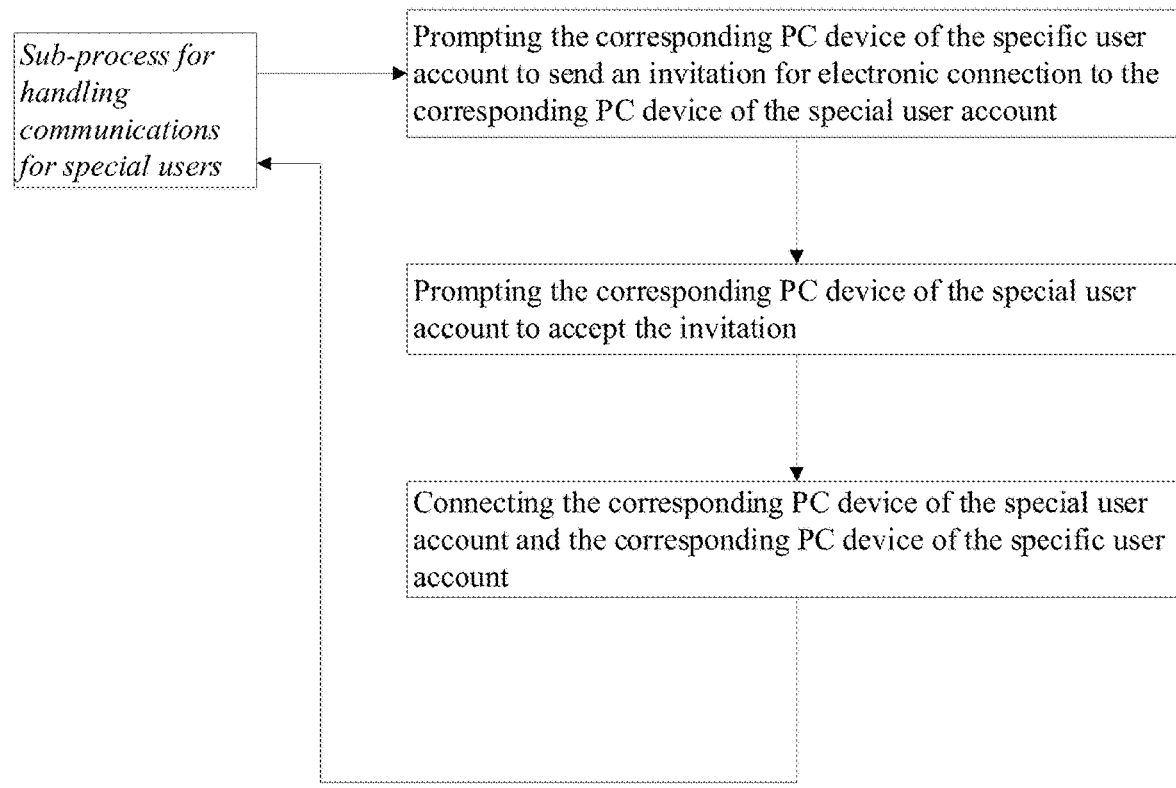
FIG. 20 is a flowchart for an alternative embodiment of a sub-process for a caregiver to handle a communication for a special user of the present invention, wherein the special user comprises a user with diminishing capacity and/or capability.

As can be seen in FIG. 19, the method of the present invention provides a sub-process for a caregiver to handle a communication for a special user who may have diminishing capacity or capability for handling robocalls. More specifically, the method provides a specific user account to a special user account of the plurality of user accounts through the remote server in Step A. The special user comprises a user with diminishing capacity or capability for handling robocalls, and the specific user comprises a caregiver of the special user. Subsequently, the method directs a call for connection from a random caller for communication with the corresponding PC device of the special user account to the corresponding PC device of the specific user account through the remote server before Step C. The specific user, or the caregiver for the special user is one of the plurality of users and may include, but is not limited to, a caregiver, care provider, a care professional, a nurse, a relative, a family member, or any suitable user or the plurality of users, etc. Thus, the method allows the specific user/caregiver to handle and/or manage the robocalls for the special user. As can be seen in FIG. 20, in an alternative embodiment of the present invention, the sub-process for the caregiver to handle communications for the special user allows the special user to electronically connect to the specific user so that the specific user can handle any incoming robocalls to the corresponding PC device of the special user. More specifically, the method prompts the corresponding PC device of the specific user account to send an invitation for electronic connection to the corresponding PC device of the special user account. Subsequently, the method prompts the corresponding PC device of the special user account to accept the invitation and connects the corresponding PC device of the special user account and the corresponding PC device of the specific user account, once the invitation is accepted. The invitation includes, but is not limited to, a link for the special user who allows the connection by the invitation sent from the specific user, for instance, the caregiver. Whenever the corresponding PC device of the special user account receives a call that violates the Telecommunications Consumer Protection Act, Fair Debt Collection Act, FTC (Federal Trade Commission) TSR (Telemarketing Sales Rule) Rules, or 101 state nuisance robocall laws, an alert is triggered, especially when the violation constitutes an attempted financial crime enabling the primary user to intervene in real-time.

Blockchain Unit (BU)

Figure 21:
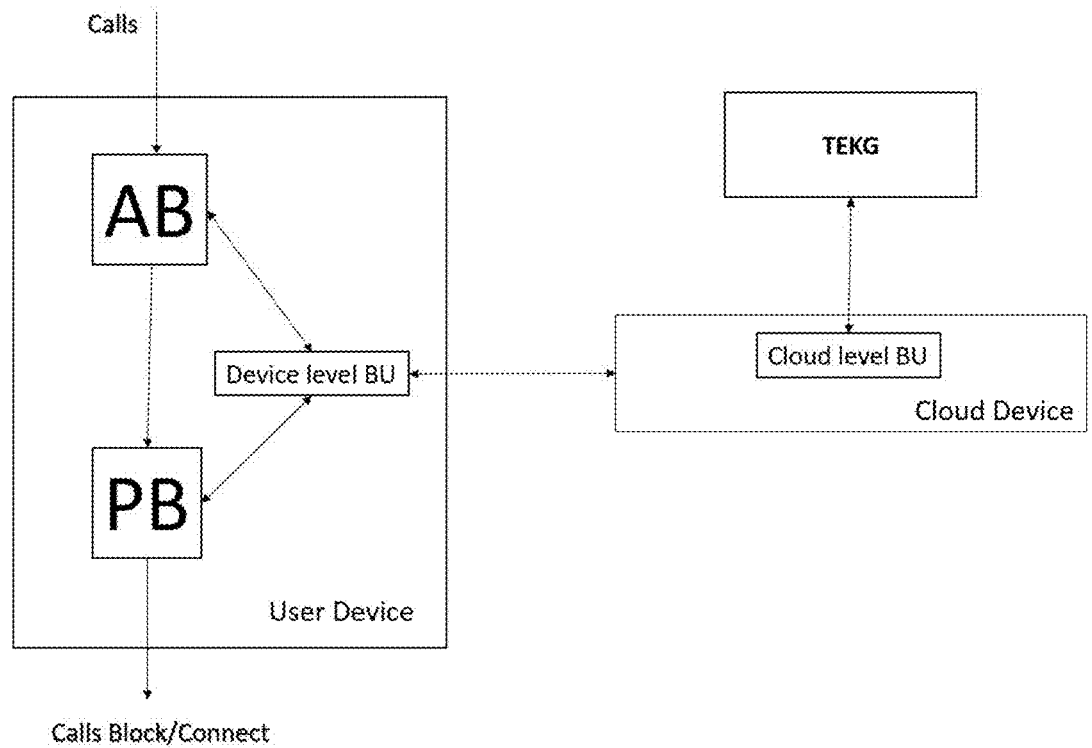
FIG. 21 is a flowchart for another embodiment of the sub-process for a caregiver to handle a communication for a special user of the present invention, wherein the special user is electronically connected to the specific user.
Figure 22:
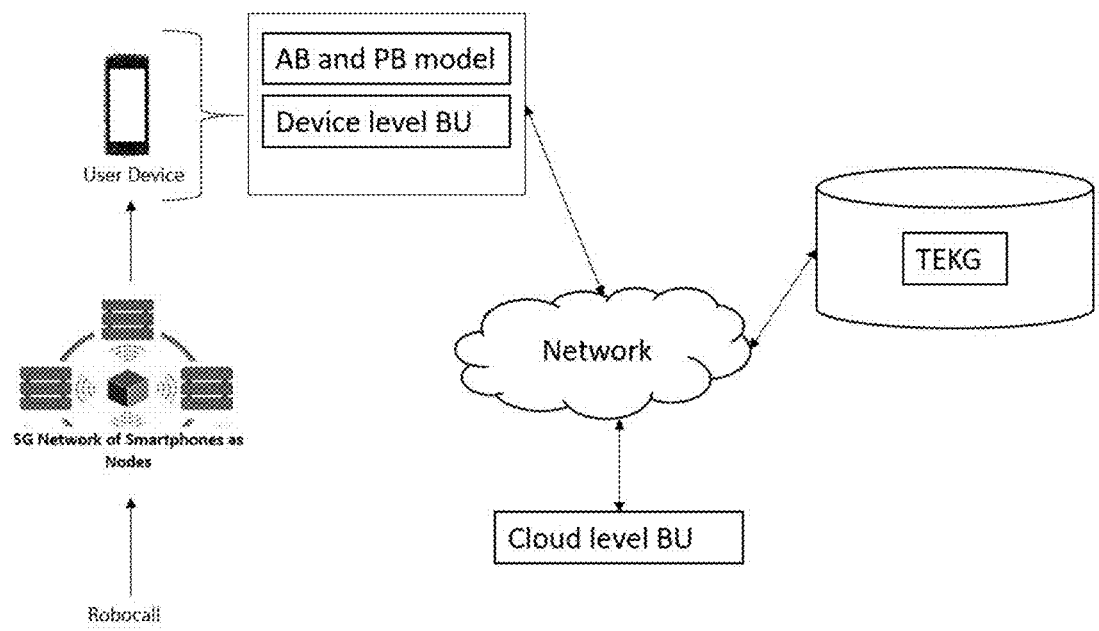
FIG. 22 is an illustration showing one embodiment of the network environment of the present invention.
Figure 23:
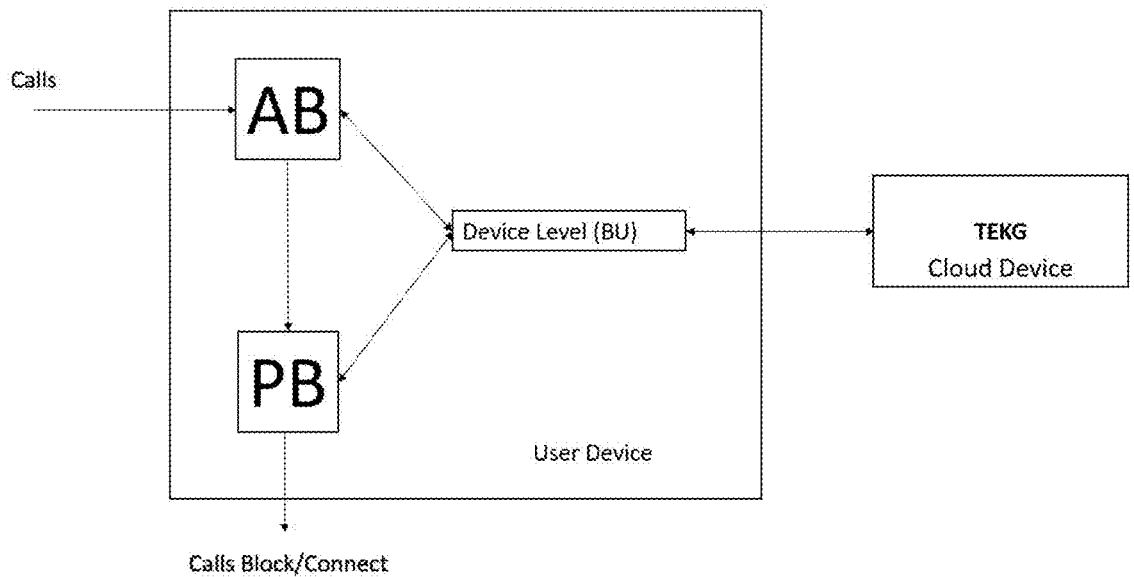
FIG. 23 is a diagrammatic view showing one embodiment of the device level BU providing an interface between the AB model and PB model of the present invention.

The blockchain unit can comprise encrypted blockchain/distributed ledger technology that can be used by the AB and PB model to ensure the validity of information. A BU is a decentralized/distributed system where the blockchain is a chain of linked information wherein each new call forms a new block. Each change in this link is distributed/shared with that network, allowing each device on the network to act as an authenticator and making it more difficult to tamper with information recorded on the blockchain. Each time a call occurs, the data are placed in blocks containing relevant information that can be recorded and accessed for future reference. The BU may be encrypted and configured to receive queries, commands, or other requests from the AB and PB models. For example, in the case of queries, the BU can refer to or look to the TEKG, which will be described later, in order to obtain answers to the queries. In some embodiments, the BU may reside on the user device (device-level BU), as shown in FIG. 21 to FIG. 23, and interact with the TEKG via the network. In other embodiments, the BU is deployed on a computing device such that the BU is configured as a cloud system (cloud-level BU), as shown in FIG. 21 and FIG. 22.

The BU generally functions as an interface to, or a subset of, enterprise data, information and system functionality via the cloud-level device. The AB or PB model may interact with the BU in the user device or cloud-level device for accessing a variety of enterprise data and information as well as affecting change within the enterprise. The AB or PB model may use this enterprise data and information to generate information for the TEKG.

Active Blocking (AB) Model

The active blocking model is located in the user's device and may include a swarm intelligence (SI), machine learning (ML) or artificial intelligence (AI) application that detects and/or classifies calls as scams, disinformation or nuisance robocalls.

The active blocking model includes a method to detect a robocall as follows: when the caller's device attempts to connect to the user through network such as 5G or later network, the user's device receives the connection request and uses the AB model to determine whether the call should be connected (e.g., ring or vibrate) or not. If the caller is determined to be a subscriber, the AB model adds a watermark (using watermarking, described in detail later) to the first X seconds of the call; if the caller is not a subscriber, however, then no watermark can be added.

Figure 24:
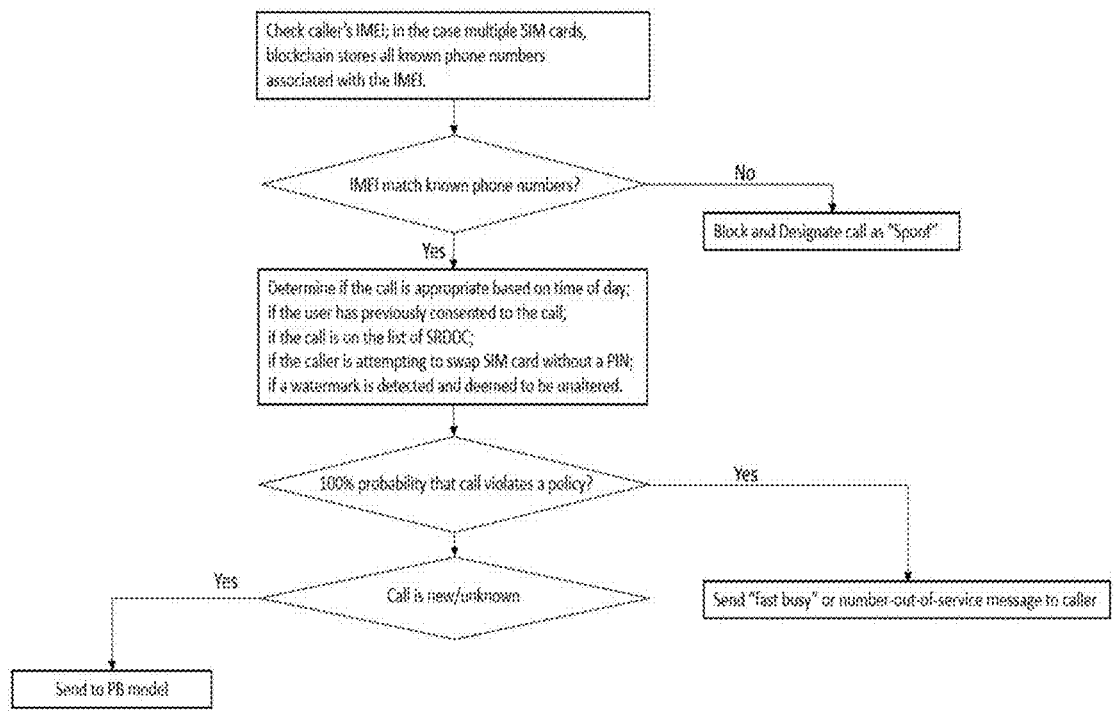
FIG. 24 is an illustration showing one embodiment of the AB model of the present invention.

In some embodiments, the AB model may be configured to be updated periodically by the cloud-level device. In some embodiments, as shown in FIG. 24, the AB model may be configured to determine call handling by the following steps: (1) checking both the caller's International Mobile Equipment Identity (IMEI) and Secure Socket Layer (SSL) certificate to confirm that the IMEI and SSL were assigned to the caller's phone number, or (2) in the case where the caller has multiple SIM cards, the blockchain stores all known phone numbers associated with the device's IMEI. If the caller's IMEI does not match the caller's known phone numbers, the call is designated "Spoof" and blocked via the blocking step.

In some embodiments, the AB model may use TEKG for call handling. The AB model may access TEKG and check the policies derived from the TEKG according to following steps: determine if the call is appropriate based on restrictions derived from federal and state laws such as time of day, if the user has previously consented to the call, if the call is on the list of scam/robocall/deepfake/disinformation calls (SRDDC) on the device-level and/or cloud-level BU, if the caller is attempting to swap SIM card without a PIN, or if a watermark is detected and deemed to be unaltered.

Figure 25:
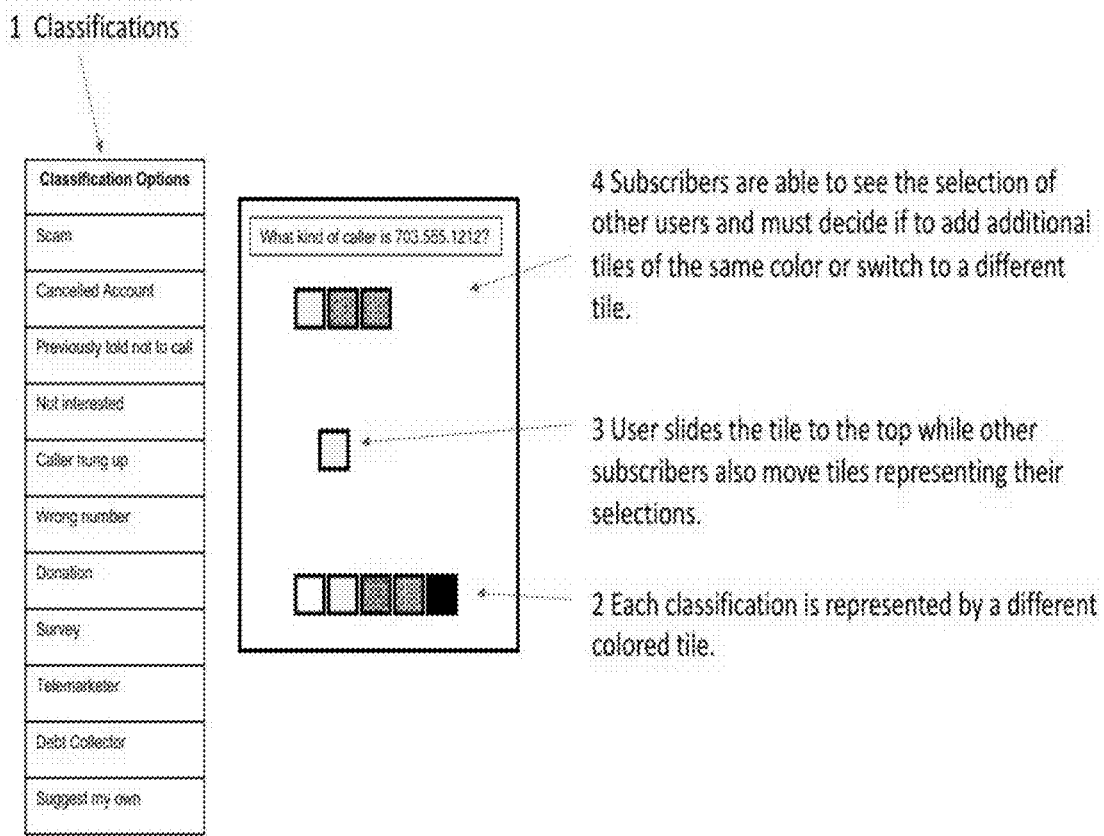
FIG. 25 is an illustration showing one embodiment of the closed-loop interaction mechanism of the present invention.
Figure 26:
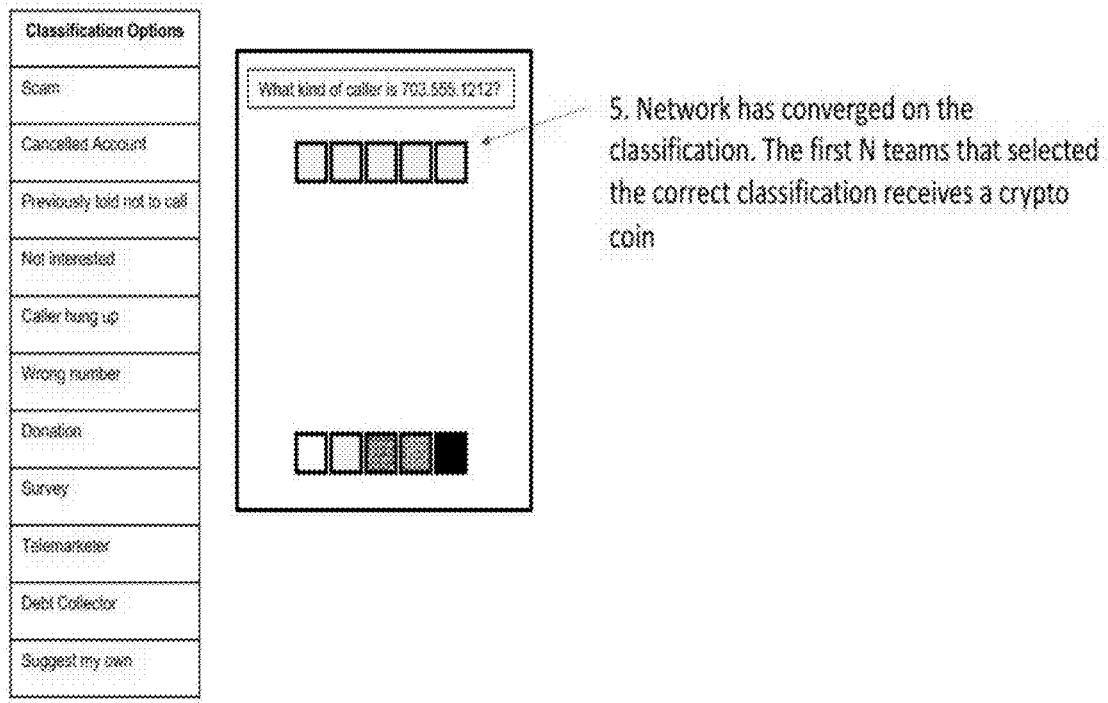
FIG. 26 is an illustration showing one embodiment of the closed-loop interaction mechanism of the present invention with the network converged on the classification.

In some embodiments, call handling may comprise steps to determine whether the call violates a policy with 97% probability. In response to a determination of a 97% probability that the call violates a policy, the AB model can return a "fast busy" or "number-out-of-service" message to the caller via the blocking step, and in response to a determination of no 97% probability that the call violates a policy and the call is new/unknown, the AB model may send the call to the PB model. In another embodiment, as shown in FIG. 25 and FIG. 26, the device level BU may launch a closed-loop interaction mechanism that enables users to collectively converge on the characteristics of a scam.

Presently, consumers suffer $15.3M in losses every month that a phone number associated with a scam is unblocked. While competitors continuously scout the terrain to identify phone numbers associated with scams, the characteristics of new scams are not sufficiently discoverable through current means. The advantage of our SI (swarming) approach includes real-time identification and blocking of new scams, and widespread dissemination of the characteristics of emerging scams thereby reducing persistence of scams.

Cloud-Level Device

In some embodiments, the robocall-blocking system may include a cloud-level device that can comprise a cloud-level BU. For example, the cloud-level device can be a cloud-based computing server configured to interact with the AB and PB models in the user device over a network.

The cloud-level device may handle the call following the steps described above using TEKG. Upon querying the TEKG, the cloud-level device is able to derive the characteristics of the policy violations, which can be reported using natural language and distributed to all nodes (including user devices) in the network. The cloud-level device may generate a report identifying the policies violated and the members of the class of each policy violation. This report can be made available for class-action lawsuits against the policy violators based on the laws of the federal government and related state governments.

In another embodiment, the cloud-level device may be used by telemarketers to test their campaigns for compliance with federal and state laws before launch, thereby reducing exposure to class action lawsuits.

In some embodiments, the network environment including the cloud device may comprise one or more cloud computing nodes with which user devices may communicate. In this network environment, nodes may also communicate with one another. They may be grouped (not shown) physically or virtually, in one or more networks such as Private, Community, Public, or a combination thereof. This allows the network environment to offer infrastructure, and/or software as services for which the user does not need to maintain resources on the user device.

Passive Blocking (PB) Model

The passive blocking model is located in the user's device and may include a natural language processor (NLP), machine learning (ML) or artificial intelligence (AI) application that will detect and/or classify calls as robocalls. If the AB model determines that the call does not have prior consent to connect, the call can be submitted to the PB model for disposition. If the user has previously consented to the call, then the phone will ring or vibrate normally.

Figure 27:
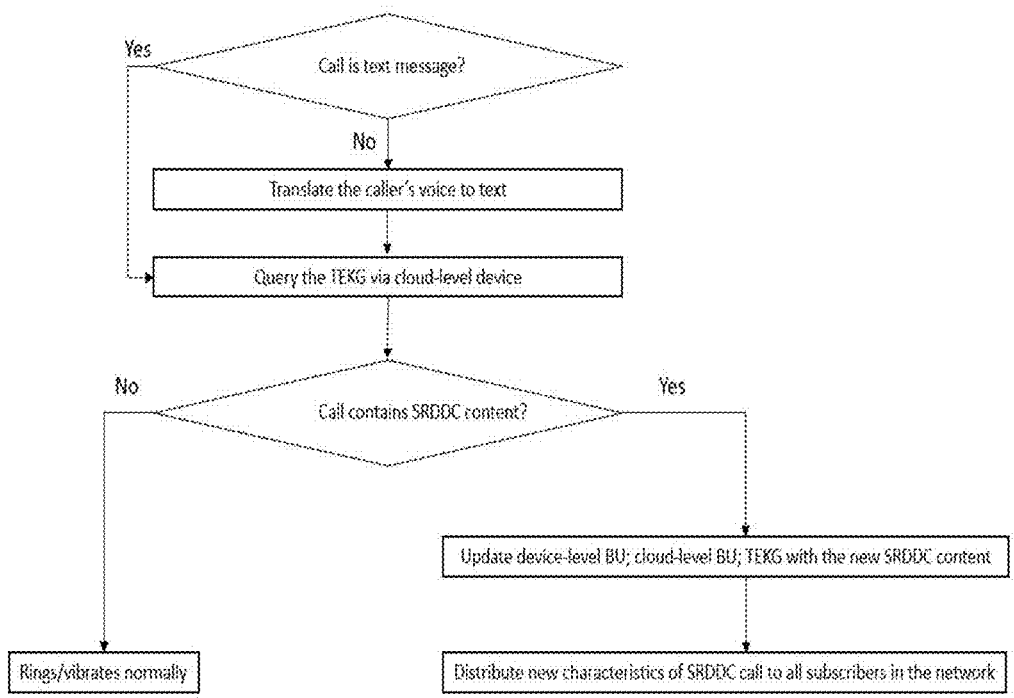
FIG. 27 is an illustration showing one embodiment of the PB model of the present invention.

The PB model can be configured to determine whether the call is allowed or unallowed. As shown in FIG. 27, the PB model may include the following call-handling steps: translate the caller's voice to text using natural language processing (NLP); query the TEKG via cloud-level device to determine if the call contains SRDDC content; if the call is a text message (whether there is consent or not), the text is sent to the PB model immediately; if the call or text is determined to include SRDDC content, the device-level BU is updated and future calls are blocked as well as future messages from a different phone number that matches the contents of the call; using back propagation, the cloud-level BU is updated; the cloud-level device updates the TEKG with the new SRDDC content; the TEKG is continuously trained using structured and unstructured data including but not limited to court records, the intuition of the network of users via swarm intelligence, and complaints filed with federal and state regulators; using a cloud service, the new characteristics of the SRDDC call are distributed to all subscribers in the network. Both the structured and unstructured data are retrieved by custom robotic process automation (RPA) robots.

Telecommunication Enterprise Knowledge Graph (TEKG)

As shown in FIG. 21 to FIG. 23, the robocall-blocking system may comprise a Telecommunication Enterprise Knowledge Graph (TEKG) which can be a business- and application-specific knowledge graph that the AB or PB model can use for general knowledge queries, user-specific master data/facts, and identification/contextualization of mapped external data sources for access as well as elements to support reasoning, disambiguation, etc. The TEKG may comprise a semantic model that ties various types of data to each other based on, for example, logic and rules, semantic relationships, and the like. The TEKG may provide a description and/or map of pieces of information relevant to an enterprise and may be monolithic or segmented, and it may comprise language-specific and/or language-independent elements.

The TEKG may, without limitation, provide the following information to the AB and PB models: the semantic information to determine the specific policies of the state and federal governments relative to caller/user location; the semantic description of all SRDDC content (reported to federal and state government or accessible from publicly available court filings/social media/wiki websites/online subscribers), the semantic description of scams from the network of users and the like. The AB or PB model can access any of the above information and update the TEKG.

Watermarking Model

The watermarking model uses the phone's IMEI, phone number, date, and time to generate a unique key that is distributed by a Key Management Service (KMS). Each key can only be used once. After the device has completed noise cancellation processing of the voice of an incoming call, the watermarking model accesses the device's noise cancellation algorithms and uses the key to determine the location and placement of a watermark that is inaudible to the human ear or other machines. This watermark is created by "turning on and off" individual bits or pixels after noise cancellation has been performed; these altered pixels cannot be distinguished from other pixels turned on and off by the noise cancellation processor. The KMS key is needed to determine which pixels have been turned on or off by the software. Once the key is applied, the decryption software is instructed regarding which pixels have been altered. The altered pixels are highlighted, and the watermark becomes visible to the software. Unlike other approaches, our approach does not increase the payload of the Voice Over Internet Protocol (VOIP) communications which would require greater bandwidth demand on the telecommunications network.

Figure 28:
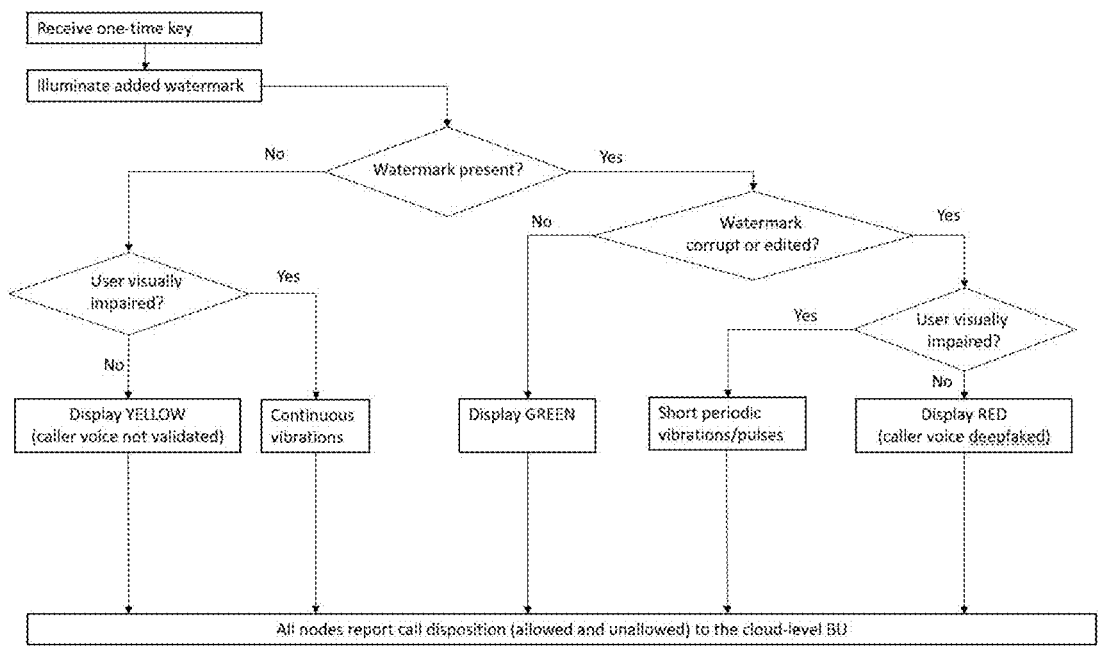
FIG. 28 is an illustration showing one embodiment of the watermarking model of the present invention.
Figure 29:
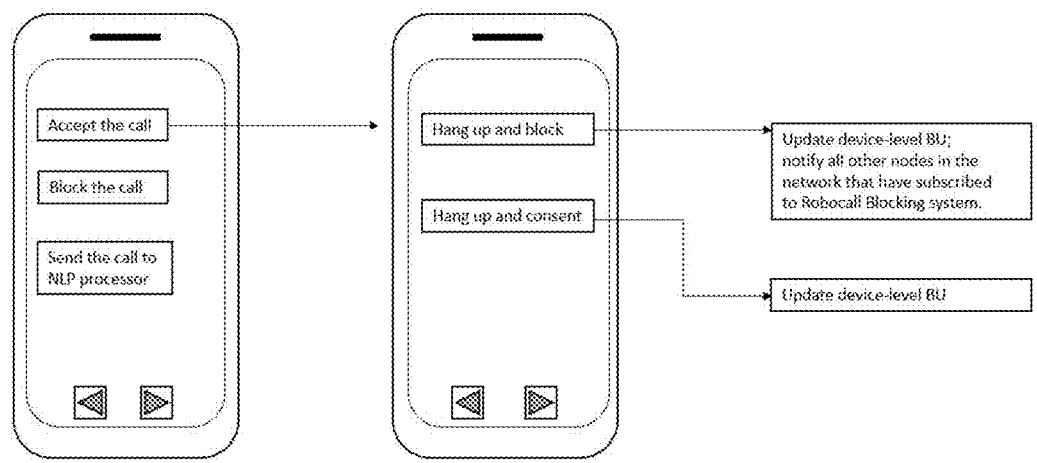
FIG. 29 is an illustration showing one embodiment of the call blocking control buttons of the present invention.

In some embodiments, as shown in FIG. 28, the watermarking model can be installed in the user's device and can include following steps: receive a one-time key from the KMS; illuminate an added watermark using the decompression and decryption algorithm with the KMS key; if a watermark is not present, display a color-coded indication (e.g., yellow) notifying the user that the caller's voice is not validated; if the user is visually impaired, generate short periodic vibrations or pulses using the phone's vibrate function; if the watermark is present but corrupt or edited, display a color-coded indication (e.g., red) to notify the user that the voice is deepfaked or phished; if the user is visually impaired, generate continuous vibrations using the phone's vibrate function; if the watermark is present and not altered or corrupted, display a color-coded indication (e.g., green); using back propagation, all nodes report call disposition (allowed and unallowed) to the cloud-level BU.

The AB and/or PB model may be optimized over time as new amounts of data are incorporated into the BU and TEKG. In various embodiments, the robocall-blocking system of the present invention may evolve and become smarter in scam and nuisance robocall identification and validation. This may, for example, result in faster response times, greater relevance of responses, fewer exchanges to satisfy an inquiry, and the like.

In some embodiments, the robocall-blocking system of the present invention may be operated according to the following steps:

1. Someone calls the user.
2. If the caller is a subscriber, the robocall-blocking system adds a watermark to the first X seconds of the call. If the caller is not a subscriber, no watermark can be added.
3. If the caller's device attempts to connect to the user through a 5G or later network, the user device receives the connection request and uses the AB model to determine if the call should be connected; alternatively, if the call does not have prior consent to connect, the call is submitted to the PB model. If the user has previously consented to the call, then the phone rings or vibrates normally.
4. The device-level BU is updated with the call disposition (i.e., Allowed or Not Allowed call).
5. Using 5G or later peer-to-peer communications exchange, all nodes on the network receive the disposition of the call. In the event that a call is determined to be Not Allowed, the caller's information on the device-level BU is updated, notifying the caller that the user has not consented to the call or consent has been revoked. Using a robotic process automation (RPA) robot, the robocall-blocking system also automatically updates the National Do Not Call Registry and related state do-not-call registries and complaint databases.
6. The call disposition is back-propagated to the cloud-level BU.
7. The cloud-level device queries a TEKG and determines which policies the call has violated.
8. If the call reported is previously unknown, a deep learning algorithm is applied across the TEKG to determine the characteristics of the new scam/robocall/deepfake/disinformation call. In another embodiment, the device level BU may launch a closed-loop interaction mechanism that enables users to collectively converge on the characteristics of a scam. The cloud-level BU is updated with the intuition of the plurality of subscribers to augment the ML/deep learning algorithms.
9. The cloud-level BU is updated with the new characteristics of the previously unknown SRDDC. The new characteristics are distributed to all subscribers on the network using a cloud deployment service. The AB or AP model in the device will now be able to block the previously unknown new SRDDC. Under the current state of the art, this process is completed each month. The one-month delay in blocking calls costs users over $15.3 million per number. Under this invention, the process is completed within a few seconds but is only possible using 5G or later networks.

10. If the call is not a SRDDC and N number of nodes may report that the call is a nuisance, the device-level BU on all devices will be updated with this information. The call is automatically blocked only for the users that have not consented or revoked consent.

11. The first X % of the N number of nodes that reported the call as either nuisance or SRDDC that has been validated by the robocall-blocking system of the present invention may receive crypto currency as an incentive for future reporting.

12. Users who are subscribers are able to form teams within their private social networks. The teams that have earned the most crypto currency over a specified period may receive additional cash incentives.

In some embodiments, the robocall-blocking system may also include device-level software that accesses the user's contact directory of consent calls and may invite members to form a team through the use of an invitation button that pushes an invitation to download the app to the invited member. The invitation includes a coupon for "Z" months of free subscription access.

In some embodiments, the present invention may include software to control blocking and accepting a call using various call blocking control buttons displayed on the user device. For example, as shown in FIG. 28, the software may be configured to display three buttons: 1) accept the call, 2) block the call, and 3) send the call to the NLP processor. If the user answers the call by pressing the accept-the-call button, the software may display two more buttons: 1) hang up and block the call, and 2) hang up and consent. If the user determines at any time during the call that the call is scam/robocall/deepfake, the user may press the hang-up-and-block button, which instantly updates the device-level BU and notifies all other nodes in the network that have subscribed to the software. If N number of nodes have also reported that the call is scam/robocall/deepfake, all nodes will be notified of the disposition of the call using 5G peer-to-peer networking and the device-level BU for all nodes will be updated. If the user presses the hang-up-and-consent button, the device-level BU can be updated with the disposition of the call.

Although the invention has been explained in relation to its preferred embodiment, it is to be understood that many other possible modifications and variations can be made without departing from the spirit and scope of the invention as hereinafter claimed.

What is claimed is:

1. A method for determining and blocking robocall communications comprising the steps of:
   (A) providing a plurality of user accounts managed by at least one remote server, wherein each of the plurality of user accounts is associated with a corresponding personal computing (PC) device;
   (B) receiving a call for connection from a random caller for communication with the corresponding PC device of a specific user account through the remote server;
   (C) determining if the connection request is a robocall with a call blocking mechanism through the remote server, wherein the call blocking mechanism comprises a blockchain unit (BU) and a telecommunication expert knowledge graph (TEKG) for call analysis and handling;
   (D) blocking the call with the corresponding PC device of the specific user account, if the call is determined to be a robocall with a statistical significance of a predetermined confidence; and
   (E) updating the blockchain record of the call using the BU through the remote server, wherein the detailed information of call analysis and handling is used to update the TEKG and shared with all user accounts;
   determining if the call is from a subscriber using an active blocking (AB) module of the call blocking mechanism with the corresponding PC device of the specific user account in step (C);
   analyzing the call using a swarm intelligence (SI), machine learning (ML), and/or artificial intelligence (AI) application of the AB module if the call is not from a subscriber;
   determining if the call from the nonsubscriber violates a policy of a plurality of SDDRC (scam/deepfake/disinformation call) policies established in TEKG according to the statistical significance of the predetermined confidence; and
   sending the policy-violating robocall from the nonsubscriber to step (D) for blocking.

2. The method for determining and blocking robocall communications as claimed in claim 1 comprising the steps of:
   the communication comprises a video message.

3. The method and system for determining and blocking robocall communications as claimed in claim 1 comprising the steps of:
   the communication comprises a text message.

4. The method for determining and blocking robocall communications as claimed in claim 1 comprising the steps of:
   the communication comprises a telephone call.

5. The method for determining and blocking robocall communications as claimed in claim 4 comprising the steps of:
   determining if the caller's International Mobile Equipment Identity (IMEI) and Secure Socket Layer (SSL) certificate were assigned to at least one phone number of the caller's PC device through the AB module;
   designating the call as a spoof robocall before sending to step (D) for blocking if the IMEI of the caller's PC device does not match any of the at least one phone number; recording all of the at least one phone number associated with the IMEI/SSL in the blockchain for the call through the BU module to be shared by all of the plurality of user accounts; and
   recording the IMEI matching results associated with the call in the blockchain.

6. The method for determining and blocking robocall communications as claimed in claim 4 comprising the steps of:
   matching the communication with the list of SDDRC communications with the corresponding PC device of the specific user account through the remote server; and
   designating the communication as a robocall in the blockchain of the BU module if the communication matching is achieved with the predetermined confidence.

7. The method for determining and blocking robocall communications as claimed in claim 4 comprising the steps of:
   determining if the communication is requested by a nonsubscriber attempting to swap a subscriber identification module (SIM) card without a personal identification number (PIN); and designating the communication as a robocall in the blockchain of the BU module if the communication matching is achieved with the predetermined confidence.

8. The method for determining and blocking robocall communications as claimed in claim 4 comprising the steps of:
analyzing the communication to determine if at least one policy of the plurality of SDDRC policies of the TEKG is violated with the predetermined confidence through the remote server; and
designating the communication as a robocall in the blockchain of the BU module if the communication violates at least one policy with the predetermined confidence.

9. The method for determining and blocking robocall communications as claimed in claim 4 comprising the steps of:
analyzing the communication using a passive blocking (PB) module, if the communication is determined to have violated at least one policy of the plurality of SDDRC policies with a confidence that is less than the predetermined confidence; transcribing the communication into text using an NLP module of the TEKG through the remote server, if the communication is not in text format;
determining if the communication in text format contains SRDDC content using AI/ML algorithms, databases, and the plurality of SRDDC policies in the TEKG; designating the communication as a robocall in the blockchain of the BU module if the communication violates at least one policy with the predetermined confidence; updating the blockchain of the communication; and updating the TEKG through a robotic process automation (RPA) module.

10. The method for determining and blocking robocall communications as claimed in claim 4 comprising the steps of:
analyzing the communication using the passive blocking (PB) module, if the communication is determined to have not violated any policy of the plurality of SDDRC policies with the predetermined confidence;
determining if the characteristics of the communication are of a robocall through a deep learning (DL) algorithm and databases of the TEKG;
designating the communication as a robocall in the blockchain of the BU module if the communication is determined to be a robocall based on the characteristics; and
updating the TEKG through a robotic process automation (RPA) module.

11. The method for determining and blocking robocall communications as claimed in claim 4 comprising the steps of: facilitating a closed-loop interaction module that engages a plurality of user accounts with corresponding PC devices to investigate/analyze the incoming communication of the specific user account through the remote server;
determining if the characteristics of the communication are of a robocall through a closed-loop interaction module and a SI algorithm of the TEKG; designating the communication as a robocall in the blockchain of the BU module if the communication is determined to be a robocall based on the characteristics; and updating the TEKG through a robotic process automation (RPA) module.

12. The method for determining and blocking robocall communications as claimed in claim 4 comprising the steps of:
determining if the call is a nuisance by matching the call with a plurality of nuisances recorded in the TEKG if the call does not violate any SRDDC policy;
designating the communication as a robocall in the blockchain of the BU module if the communication is determined to be a nuisance with a predetermined number of occurrences; and updating the TEKG through a robotic process automation (RPA) module.

13. The method for determining and blocking robocall communications as claimed in claim 4 comprising the steps of:
choosing a specific message from a plurality of messages to be sent to step (D) to prompt the caller whiling blocking the communication with the corresponding PC device of the specific user account; wherein the plurality of messages comprises a "fast busy" message; and wherein the plurality of messages comprises a "number out of service" message.

14. The method for determining and blocking robocall communications as claimed in claim 1 comprising the steps of:
generating a one-time key through a key management service (KMS) with the corresponding PC device of the specific user account in step (B), if the caller is a subscriber; watermarking a specific portion of the incoming communication by turning on/off individual pixels through a watermarking module;
wherein the watermarking module uses the one-time key, the IMEI of the caller's PC device, date and time of the incoming communication to determine the location and on/off placement of each pixel; and prompting the corresponding PC device of the specific user account with the non-robocall incoming communication before step (E).

15. The method for determining and blocking robocall communications as claimed in claim 14 comprising the steps of: verifying the presence of a watermark of the call for the incoming communication using the watermarking module; notifying the corresponding PC device of the specific user account that the caller is not validated if the watermark is not present; and blocking the incoming communication.

16. The method for determining and blocking robocall communications as claimed in claim 14 comprising the steps of: analyzing the watermark for the incoming communication for validity using the KMS key and a decryption and decompression algorithm of the watermarking module; notifying the corresponding PC device of the specific user account that the incoming communication is a robocall if the watermark is corrupt or altered; and blocking the incoming communication.

17. The method for determining and blocking robocall communications as claimed in claim 14 comprising the steps of: notifying the corresponding PC device of the specific user account with short periods of vibrations or pulses if the incoming communication is a robocall; blocking the incoming communication; and updating the blockchain of the incoming communication through the BU.

18. The method for determining and blocking robocall communications as claimed in claim 1 comprising the steps of:
providing a manual module to the corresponding PC device of the specific user account to handle the incoming call for communication through the remote server in step (B); prompting the corresponding PC device of the specific user account to accept the call; prompting the corresponding PC device of the specific user account to hang up and block the call if the call is determined to be a robocall by the specific user account; blocking the incoming communication; and updating the blockchain record of the accepted communication with the BU before step (E).

19. The method for determining and blocking robocall communications as claimed in claim 18 comprising the steps of:

prompting the corresponding PC device of the specific user account to consent to the call if the call is determined to not be a robocall by the specific user account; and updating the blockchain record of the accepted communication with the BU before step (E).

20. The method for determining and blocking robocall communications as claimed in claim 1 comprising the steps of:

providing a specific user account to a special user account of the plurality of user accounts through the remote server in step (A);

wherein the special user account comprises a user with diminishing capacity or capability for handling robocalls; wherein the specific user account comprises a caregiver of the special user account; and directing a call for connection from a random caller for communication with the corresponding PC device of the special user account to the corresponding PC device of the specific user account through the remote server before step (C).

21. The method for determining and blocking robocall communications as claimed in claim 20 comprising the steps of:

prompting the corresponding PC device of the specific user account to send an invitation for electronic connection to the corresponding PC device of the special user account; prompting the corresponding PC device of the special user account to accept the invitation; and connecting the corresponding PC device of the special user account and the corresponding PC device of the specific user account.

* * * * *